(12) United States Patent
Blachere et al.

(10) Patent No.: US 12,188,841 B2
(45) Date of Patent: Jan. 7, 2025

(54) IMAGING SYSTEM MOUNTABLE TO A BEARING RING

(71) Applicant: AKTIEBOLAGET SKF, Gothenburg (SE)

(72) Inventors: Sebastien Blachere, The Hague (NL); Mourad Chennaoui, Amsterdam (NL); Loic Jacob, Sorbiers (FR)

(73) Assignee: AKTIEBOLAGET SKF, Gothenburg (SE)

( * ) Notice: Subject to any disclaimer, the term of this patent is extended or adjusted under 35 U.S.C. 154(b) by 416 days.

(21) Appl. No.: 17/643,300

(22) Filed: Dec. 8, 2021

(65) Prior Publication Data

US 2023/0175924 A1 Jun. 8, 2023

(51) Int. Cl.
*G01M 13/04* (2019.01)
*G06T 7/00* (2017.01)
(Continued)

(52) U.S. Cl.
CPC ........... *G01M 13/04* (2013.01); *G06T 7/0004* (2013.01); *H04N 23/695* (2023.01);
(Continued)

(58) Field of Classification Search
CPC ... G01M 13/04; H04N 23/695; H04N 23/698; H04N 23/80; F16C 2233/00;
(Continued)

(56) References Cited

U.S. PATENT DOCUMENTS

2011/0049831 A1   3/2011   Lumpkin
2011/0235894 A1*  9/2011   Bookout ............... G06T 7/0004
                                                382/141
(Continued)

FOREIGN PATENT DOCUMENTS

CN      102636490 B      1/2014
DE      102015206613 A1  10/2016
(Continued)

OTHER PUBLICATIONS

Shengping Wen, "Vision-Based Surface Inspection System for Bearing Rollers Using Convolutional Neural Networks", Applied Sciences, Published: Dec. 11, 2018 in Appl. Sci. 2018, 8, 2565, www.mdpi.com/journal/applsci, Licensee MDPI, Basel, Switzerland.
(Continued)

*Primary Examiner* — Ross Varndell
*Assistant Examiner* — Heath E. Wells
(74) *Attorney, Agent, or Firm* — J-TEK LAW PLLC; Scott T. Wakeman; Mark A. Ussai

(57) ABSTRACT

An imaging system is for recording images of a raceway of a bearing ring, the ring having two opposing axial ends, a central axis extending between the axial ends, and inner and outer circumferential surfaces. The raceway is formed on the inner circumferential surface or the outer circumferential surface of the ring and has first and second ends spaced along the central axis. The imaging system includes a frame movably coupleable with the bearing ring and having a centerline. A drive is mounted to the frame and is configured to angularly displace the frame about the bearing central axis. An optical imager has a lens and an adjustable positioner is mounted on the frame and is configured to position the optical imager such that the lens is disposed axially between the raceway first and second ends and faces generally perpendicular to the bearing raceway.

20 Claims, 24 Drawing Sheets

(51) Int. Cl.
*H04N 23/695* (2023.01)
*H04N 23/698* (2023.01)
*H04N 23/80* (2023.01)

(52) U.S. Cl.
CPC ........... *H04N 23/698* (2023.01); *H04N 23/80* (2023.01); *F16C 2233/00* (2013.01); *G06T 2207/30108* (2013.01)

(58) Field of Classification Search
CPC ........... G01N 21/95; G01N 2021/9548; G01N 21/952; G01N 21/954
USPC ....................................................... 382/152
See application file for complete search history.

(56) References Cited

U.S. PATENT DOCUMENTS

| | | | |
|---|---|---|---|
| 2014/0260705 A1 | 9/2014 | Kimpel, Jr. et al. | |
| 2018/0202944 A1* | 7/2018 | Sanchez | G01N 21/954 |
| 2022/0198784 A1* | 6/2022 | Toporek | G06V 10/7747 |
| 2022/0366558 A1* | 11/2022 | Bufi | G06V 10/764 |
| 2023/0196096 A1* | 6/2023 | Milne | G06N 3/047 |
| | | | 706/25 |

FOREIGN PATENT DOCUMENTS

| | | | | |
|---|---|---|---|---|
| EP | 1972918 A2 * | 9/2008 | | F16C 19/52 |
| EP | 2777016 B1 | 3/2019 | | |
| JP | 2012154639 A | 8/2012 | | |
| KR | 20150021153 A | 3/2015 | | |
| KR | 102067725 B1 | 1/2020 | | |
| WO | WO-2018136769 A1 * | 7/2018 | | B05D 3/002 |

OTHER PUBLICATIONS

Unpublished U.S. Appl. No. 17/480,623.
International Search Report and Written Opinion dispatched Dec. 16, 2022 in related application No. PCT/EP2022/074947.
International Search Report and Written Opinion dispatched Mar. 2, 2023 in related application No. PCT/EP2022/082933.

* cited by examiner

IMAGING SYSTEM MOUNTABLE TO A BEARING RING

BACKGROUND OF THE INVENTION

The present invention relates to imaging systems, and more particularly to imaging systems for recording images of raceways of rolling element bearings.

As is well known, rolling element bearings include an inner ring, an outer ring and a plurality of rolling elements rotatably coupling the inner and outer rings. The rolling elements roll simultaneously upon an inner raceway on the outer surface of the inner ring and on an outer raceway on the inner surface of the outer ring. After a period of use, certain defects to these raceways may occur, such as brinelling, galling, spalling, fretting, etc., which may greatly affect the overall performance of the bearing.

As a result, it is desirable to inspect a sample of bearings in any particular application after a period of time to detect such raceway issues before a potentially catastrophic failure. One inspection method is to record or "take" images (e.g., photos, videos, etc.) of the bearing raceways for both an initial damage assessment and comparison over a period of time to detect wear or damage trends. Typically, the bearing is photographed or otherwise recorded by positioning a camera, microscope or other optical imager facing along the central axis of the bearing ring to take a single image of the entire raceway, which often results in a distorted view of the raceway.

SUMMARY OF THE INVENTION

In one aspect, the present invention is an imaging system for recording images of a raceway of a bearing ring, the ring having two opposing axial ends, a central axis extending between the axial ends, and inner and outer circumferential surfaces. The raceway is formed on the ring inner circumferential surface or the ring outer circumferential surface and has first and second axial ends spaced along the central axis. The imaging system comprises a frame movably coupleable with the bearing ring and having a centerline and a drive mounted to the frame and configured to angularly displace the frame about the bearing central axis. An optical imager has a lens and an adjustable positioner is mounted on the frame and is configured to position the optical imager such that the lens is disposed axially between the raceway first and second ends and facing generally perpendicular to the bearing raceway.

In another aspect, the present invention is again an imaging system for recording images of a raceway of a bearing ring, the ring having two opposing axial ends, a central axis extending between the axial ends, and inner and outer circumferential surfaces. The raceway is formed on the ring inner circumferential surface or the ring outer circumferential surface and has first and second axial ends spaced along the central axis. The imaging system comprises a frame movably coupleable with the bearing ring and including a main beam sized to extend diametrically across one of the two axial ends of the bearing ring and having opposing first and second axial ends and centerline extending between the first and second axial ends. A drive base is connected with the first axial end of the main beam and a driven roller is rotatably connected with the drive base and is rollable along the ring outer circumferential surface or along the ring inner circumferential surface so as to angularly displace the frame about the central axis of the bearing. An idler roller is rotatably connected with the beam so as to be spaced horizontally from the driven roller, the idler roller being rollable along the bearing inner surface when the driven roller rolls along the bearing inner surface and is rollable along the bearing outer surface when the driven roller rolls along the bearing outer surface. Further, a drive is mounted to the frame and includes a motor coupled with the driven roller and configured to rotate the driven roller about the central axis. An optical imager has a lens and an adjustable positioner is mounted on the main beam of the frame and is configured to position the optical imager such that the lens is disposed axially between the raceway first and second ends and facing generally perpendicular to the bearing raceway. Furthermore, a processor is configured to operate the optical imager and the drive motor such that the optical imager takes a series of images about the entire perimeter of the bearing raceway as the drive motor angularly displaces the frame at least one revolution about the centerline, each image depicting a separate one of a plurality of arcuate segments of the raceway.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
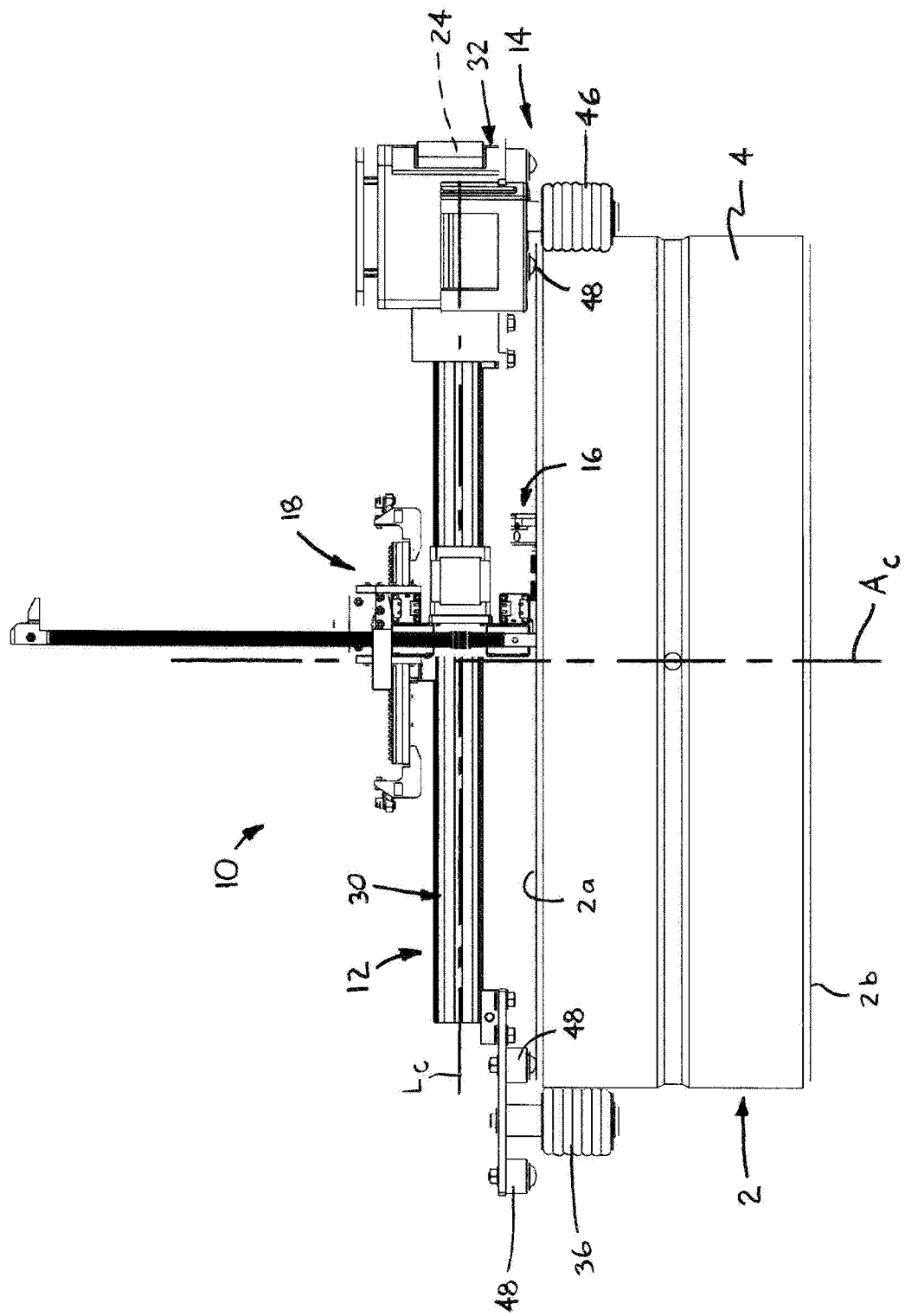
FIG. 1 is a side elevational view of the imaging system of the present invention, shown configured in a first arrangement for recording images of an outer raceway and mounted on a bearing outer ring.

Certain terminology is used in the following description for convenience only and is not limiting. The words "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 2:
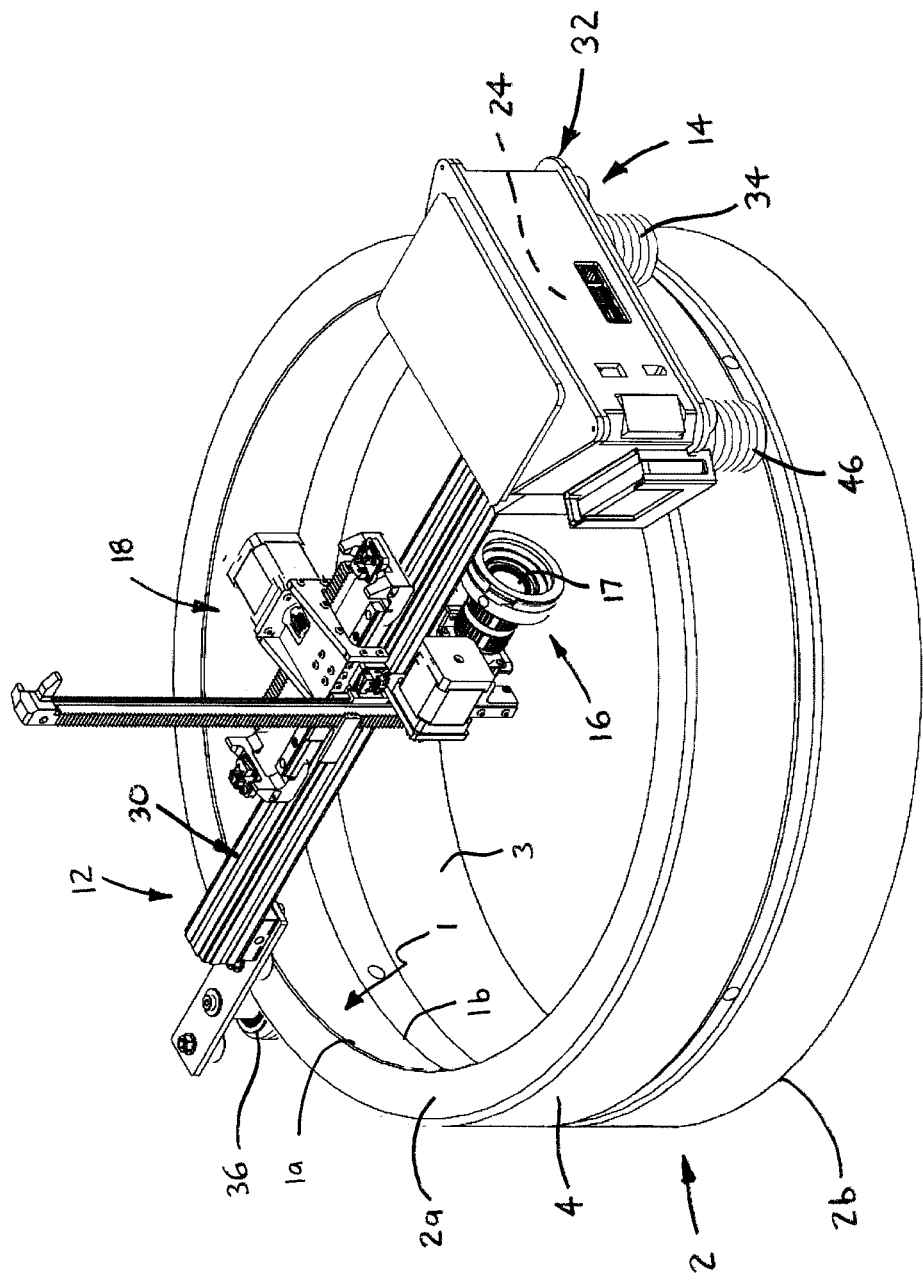
FIG. 2 is a rear perspective view of the first arrangement imaging system.
Figure 3:
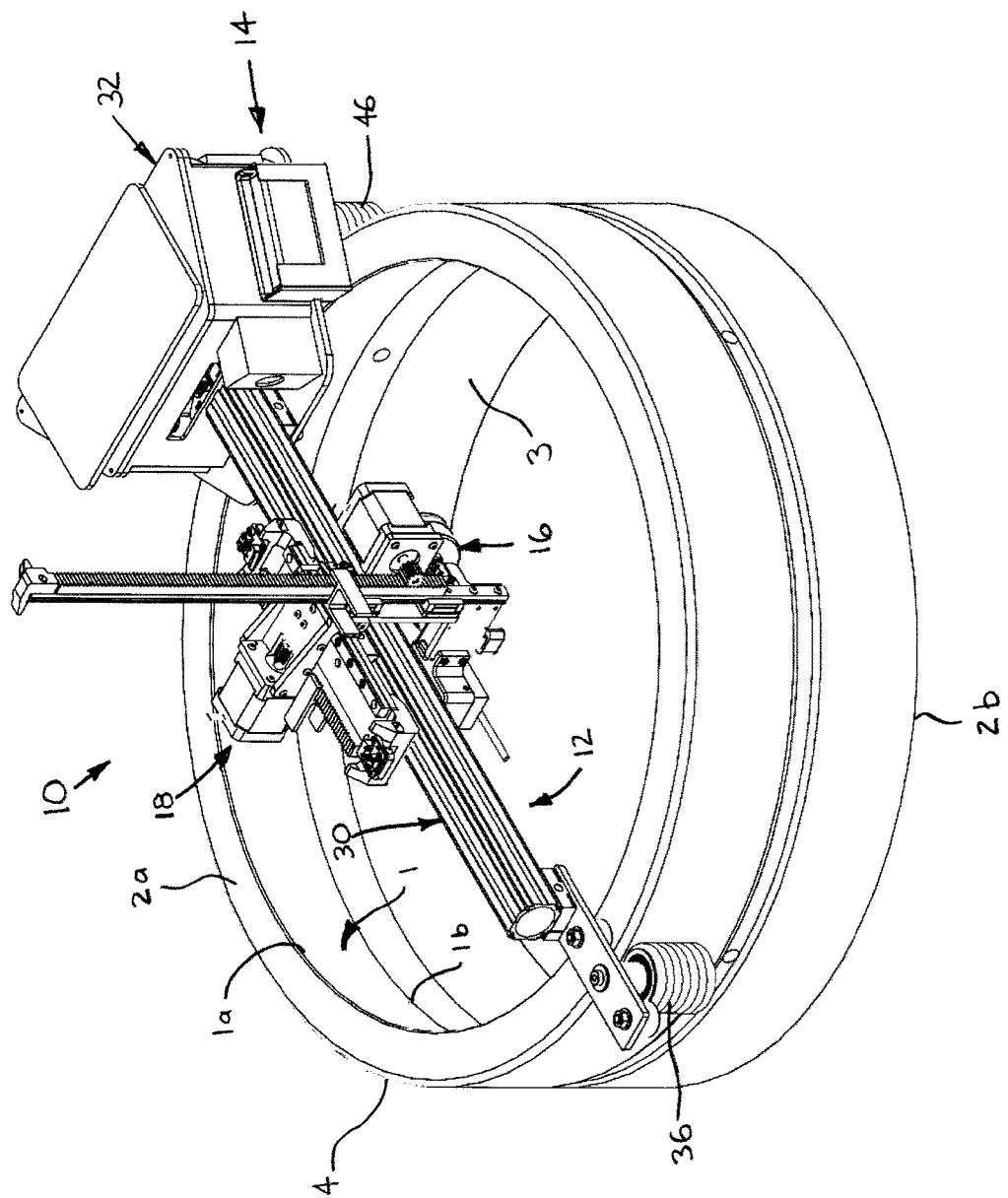
FIG. 3 is a front perspective view of the first arrangement imaging system.
Figure 4:
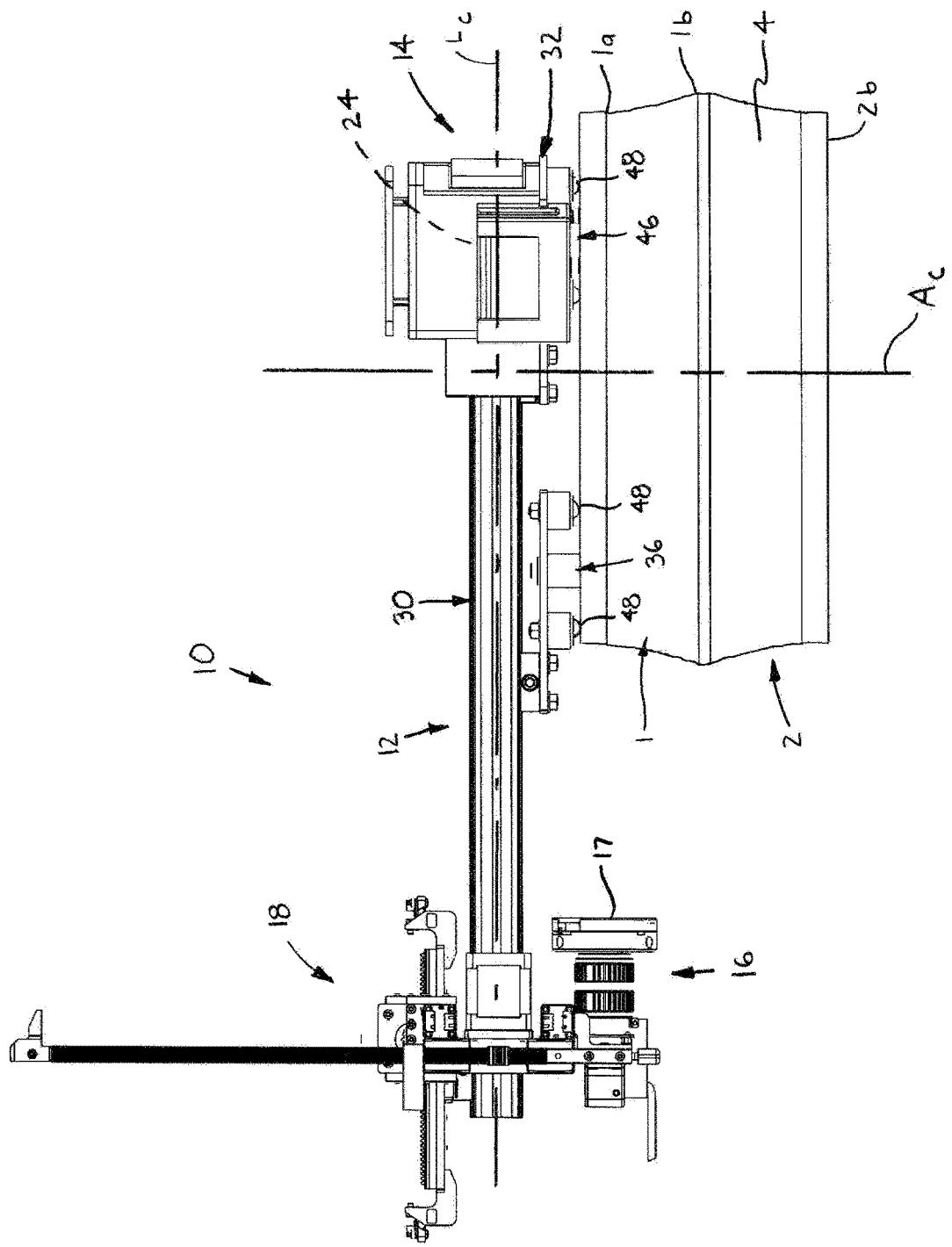
FIG. 4 is a side elevational view of the imaging system of the present invention, shown configured in a second arrangement for recording images of an inner raceway and mounted on a bearing inner ring.
Figure 5:
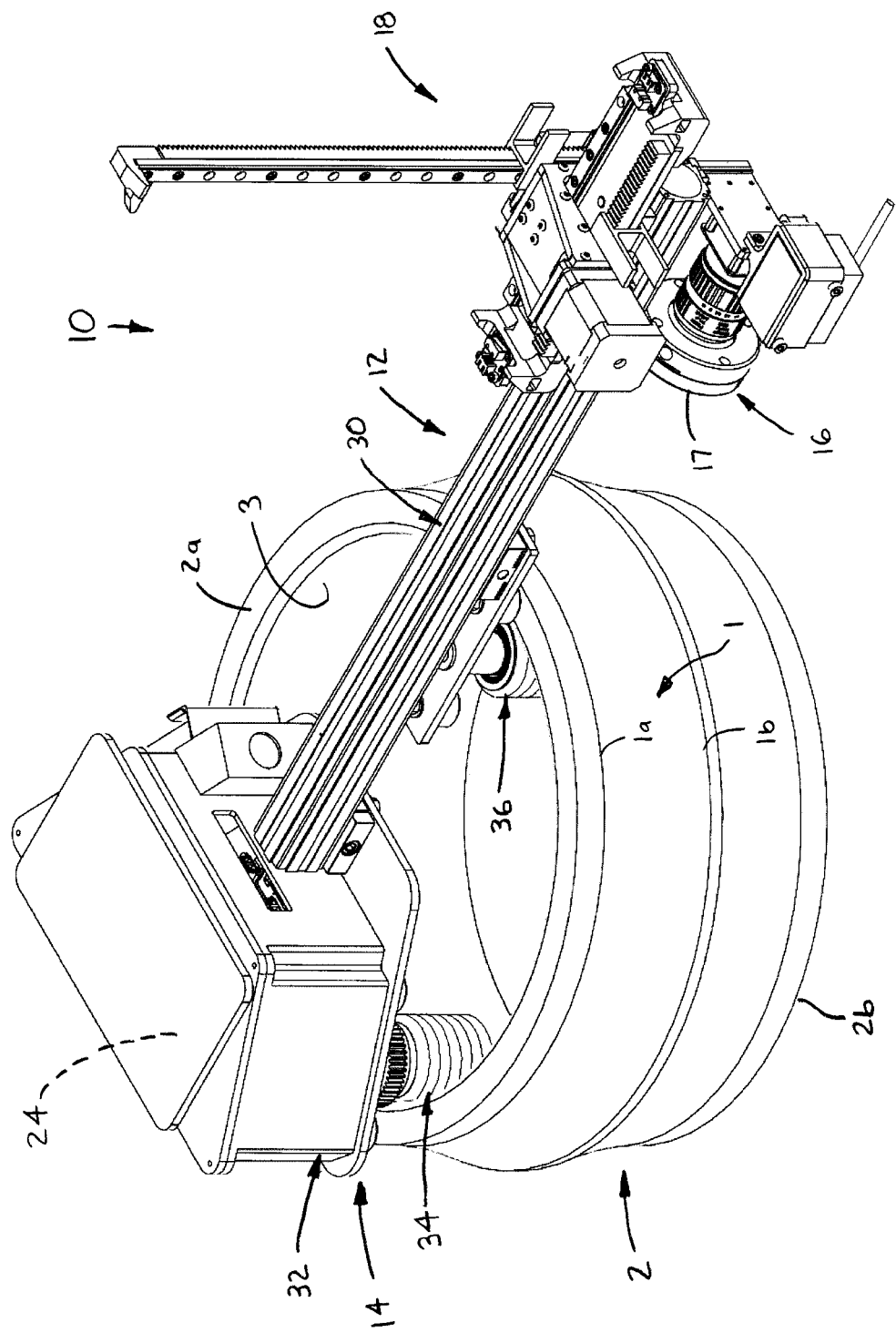
FIG. 5 is a front perspective view of the second arrangement imaging system.
Figure 6:
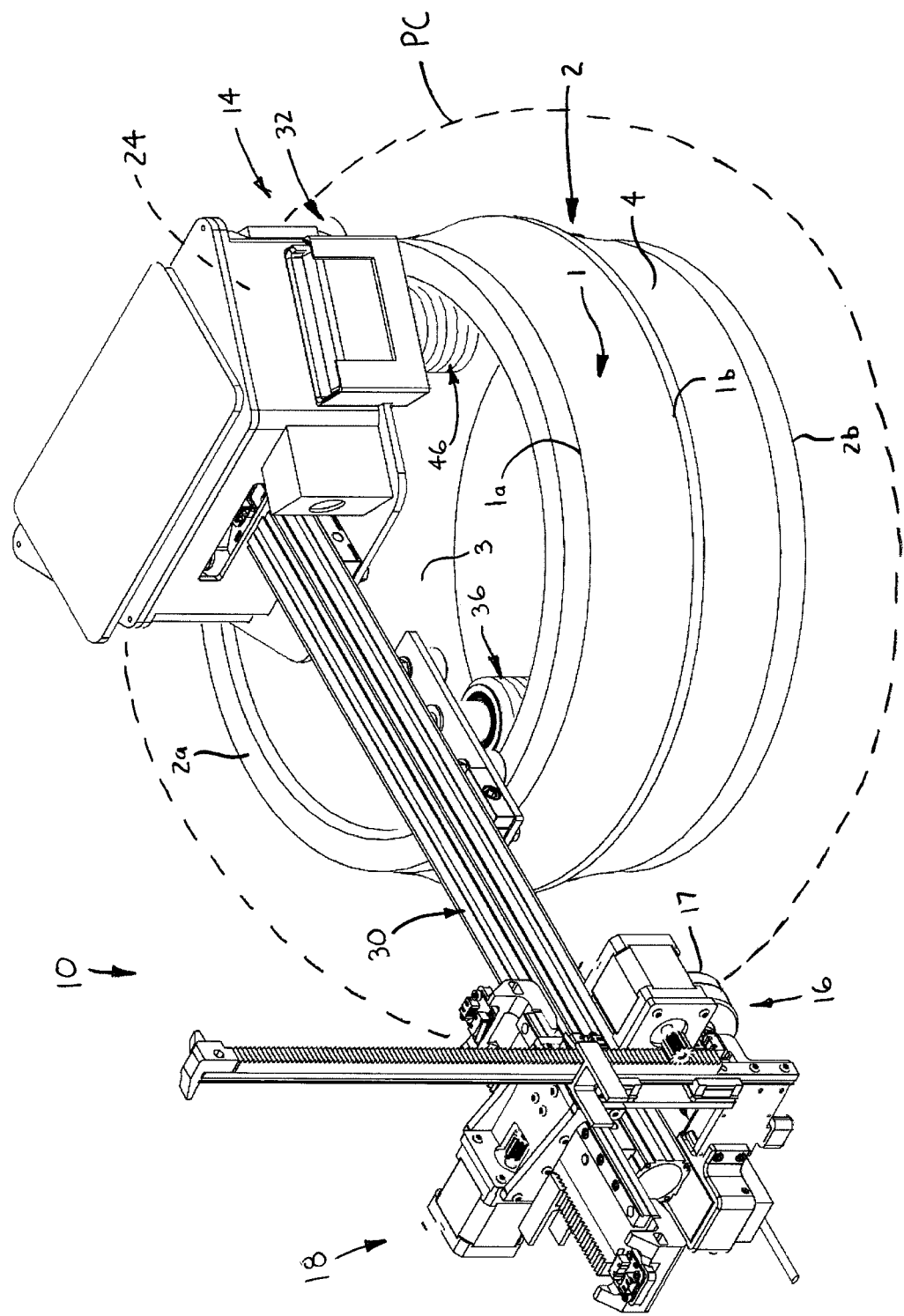
FIG. 6 is another front perspective view of the second arrangement imaging system.

Referring now to the drawings in detail, wherein like numbers are used to indicate like elements throughout, there is shown in FIGS. 1-25 an imaging system 10 for recording images, preferably digital photographs, of a raceway 1 of a bearing ring 2. The bearing ring 2 has two opposing axial ends 2a, 2b, a central axis $A_C$ extending between the axial ends 2a, 2b, and inner and outer circumferential surfaces 3, 4, respectively, and may include only a single raceway 1 or two or more raceways 1. The raceway 1 has first and second axial ends 1a, 1b spaced along the ring central axis $A_C$ and is either an outer raceway formed on the ring inner circumferential surface 3 when the ring 2 is an outer ring, as shown in FIGS. 1-3 or is an inner raceway formed on the ring outer circumferential surface 4 when the ring 2 is an inner ring, as depicted in FIGS. 4-6. The imaging system 10 basically comprises a frame 12 moveably coupleable with the bearing ring 2, a drive 14 mounted on the frame 12, an optical imager 16, and an adjustable positioner 18 for securing and positioning the optical imager 16.

More specifically, the frame 12 is connectable with and supported on one axial end 2a or 2b of the bearing ring 2, is generally elongated, and has a centerline $L_C$ which is generally perpendicular to, and preferably intersecting with, the bearing ring central axis $A_C$ when the frame 12 is coupled with the ring 2. The drive 14 is configured to angularly displace the frame 12 about the bearing central axis $A_C$ and includes a drive motor 20 (FIG. 24) for driving a driven roller 34 of the frame 12, as described below. The optical imager 16 has a lens 17 and is preferably a digital camera or a microscope incorporating a digital camera, but may be any other appropriate device capable of recording optical images or even another type of imaging device, such as an x-ray camera. Further, the positioner 18 is mounted on the frame 12 and is configured to position the optical imager 16 such that the lens 17 is disposed axially between the raceway first and second axial ends 1a, 1b and facing generally perpendicular to the bearing raceway 1.

Figure 10:
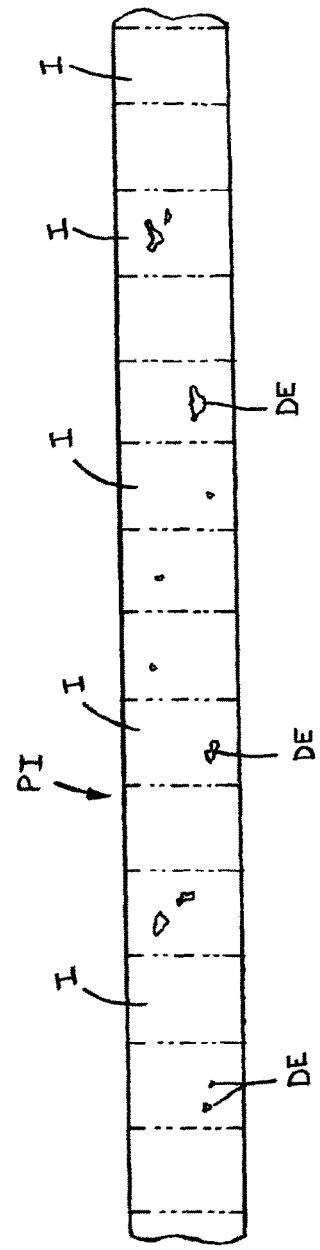
FIG. 10 is a broken-away view of a panoramic image taken of the bearing raceway of FIG. 9.
Figure 11:
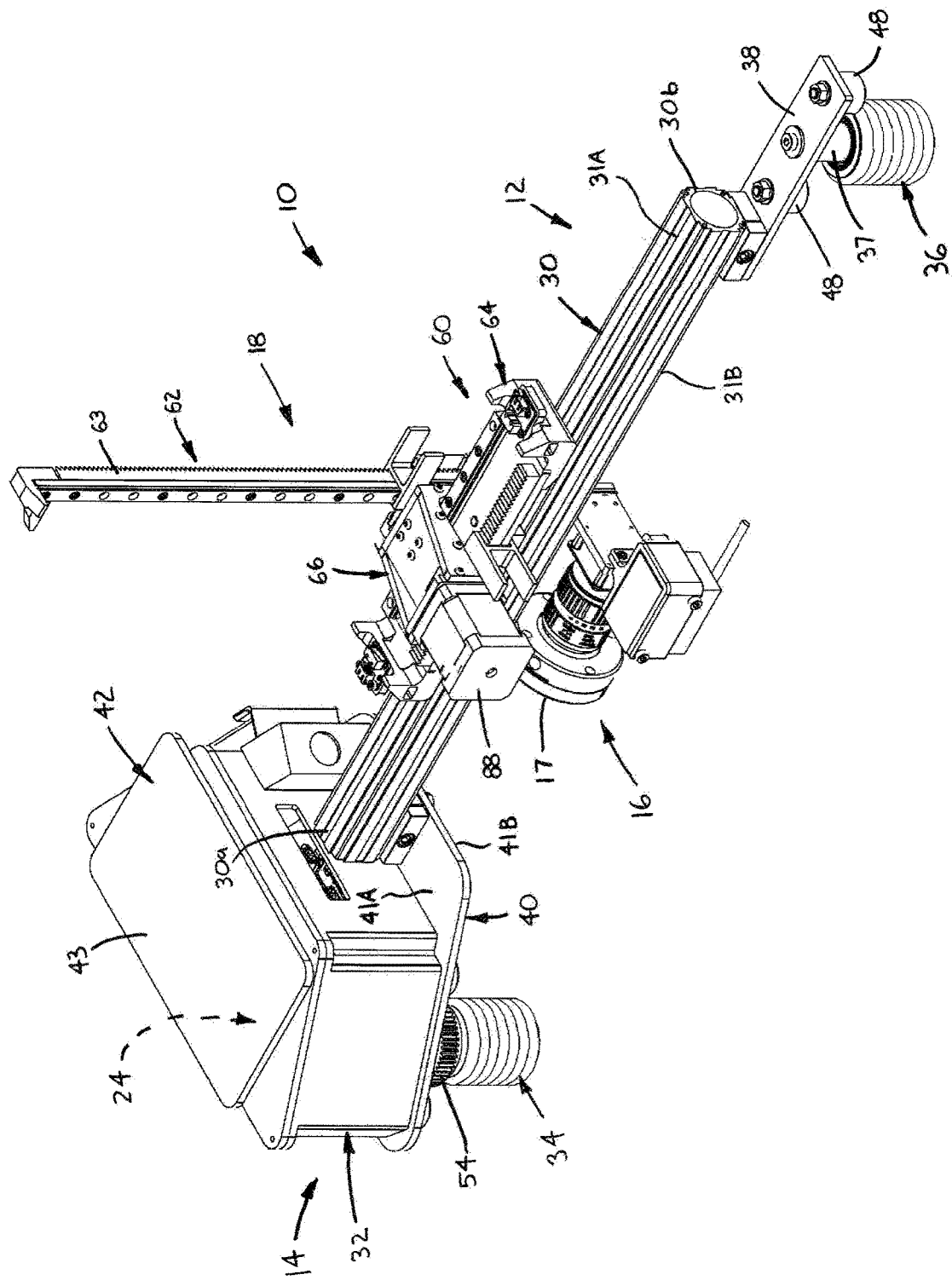
FIG. 11 is front perspective view of the imaging system shown configured in the first arrangement.
Figure 12:
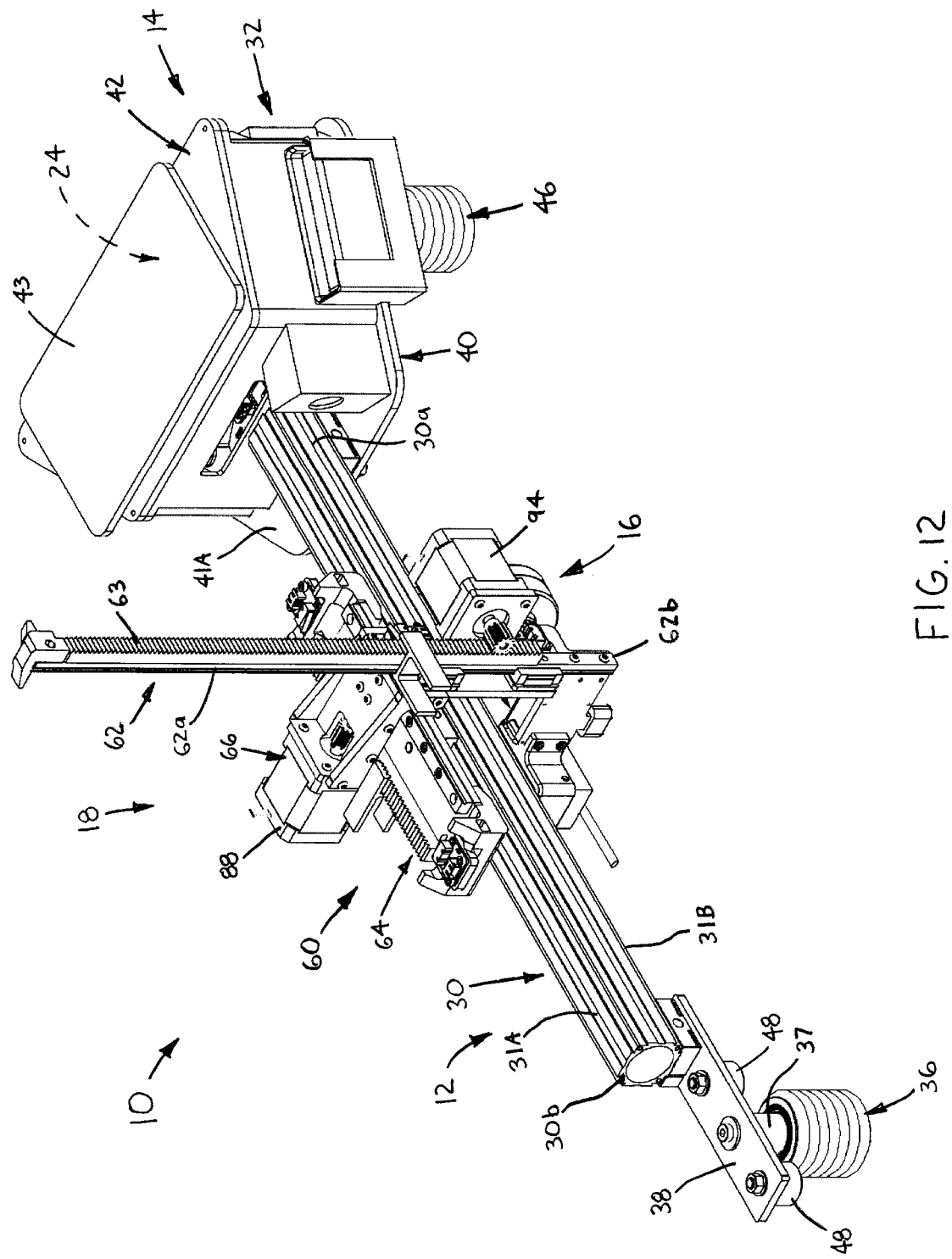
FIG. 12 is another front perspective view of the first arrangement imaging system.
Figure 13:
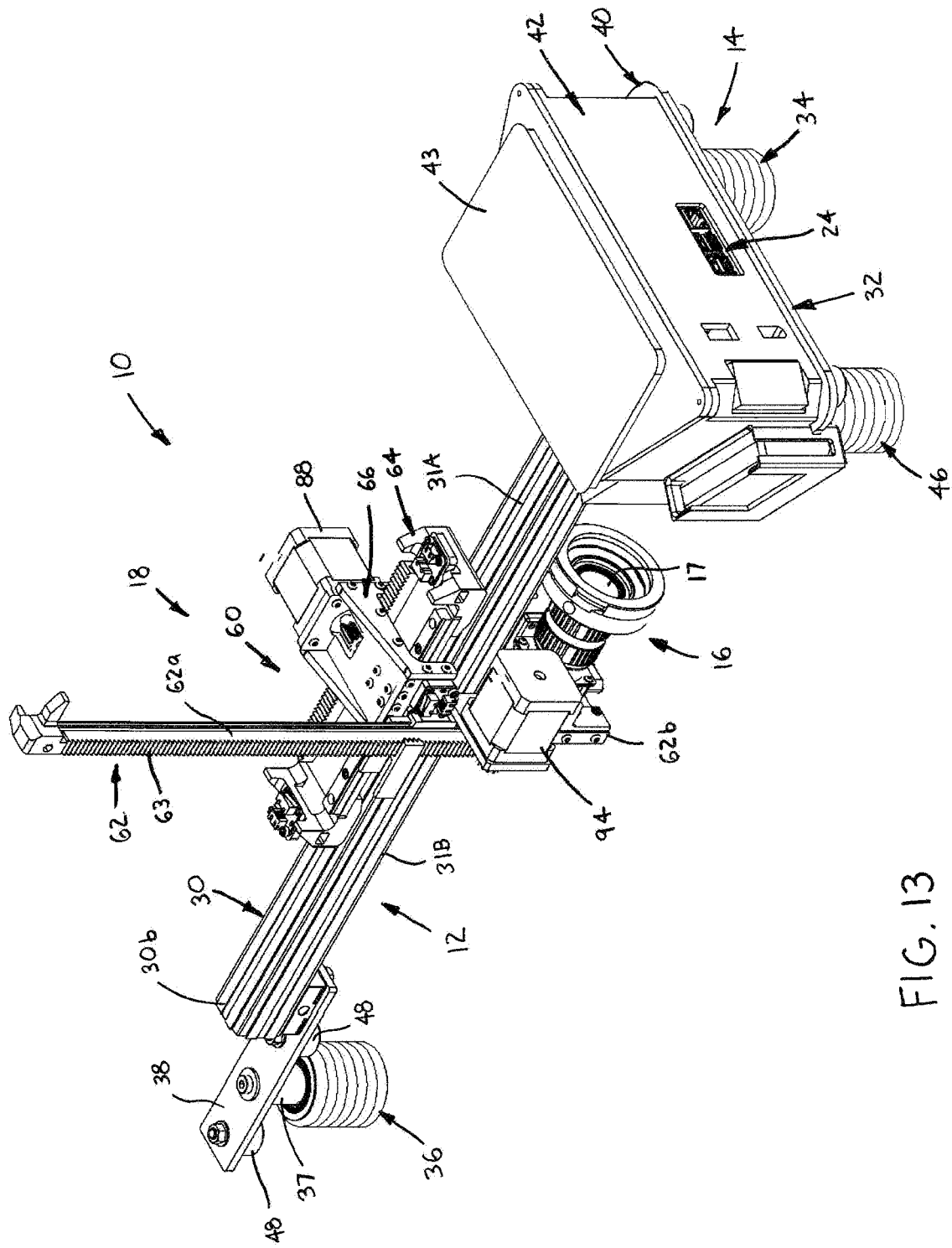
FIG. 13 is a rear perspective view of the first arrangement imaging system.
Figure 14:
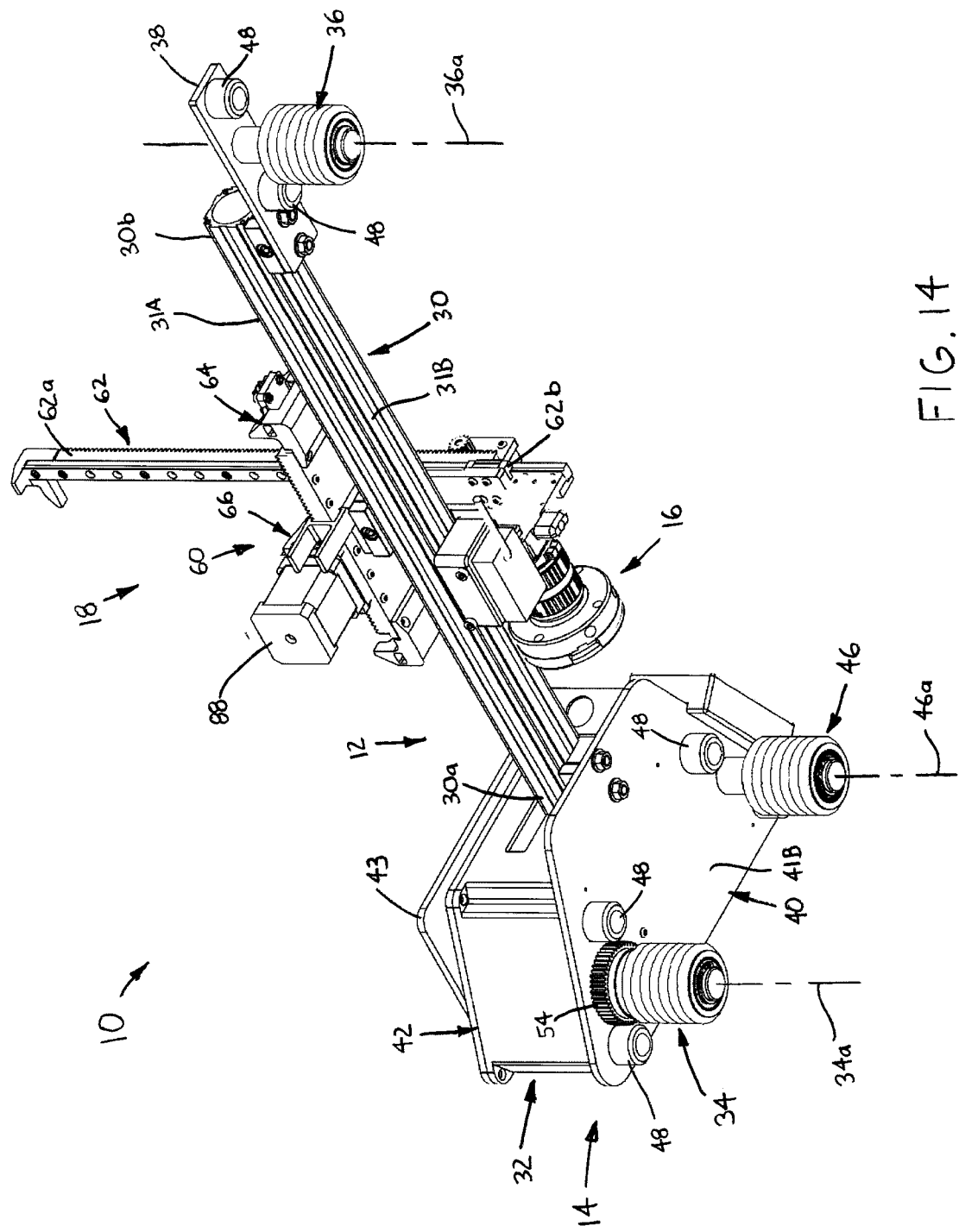
FIG. 14 is a bottom perspective view of the first arrangement imaging system.
Figure 15:
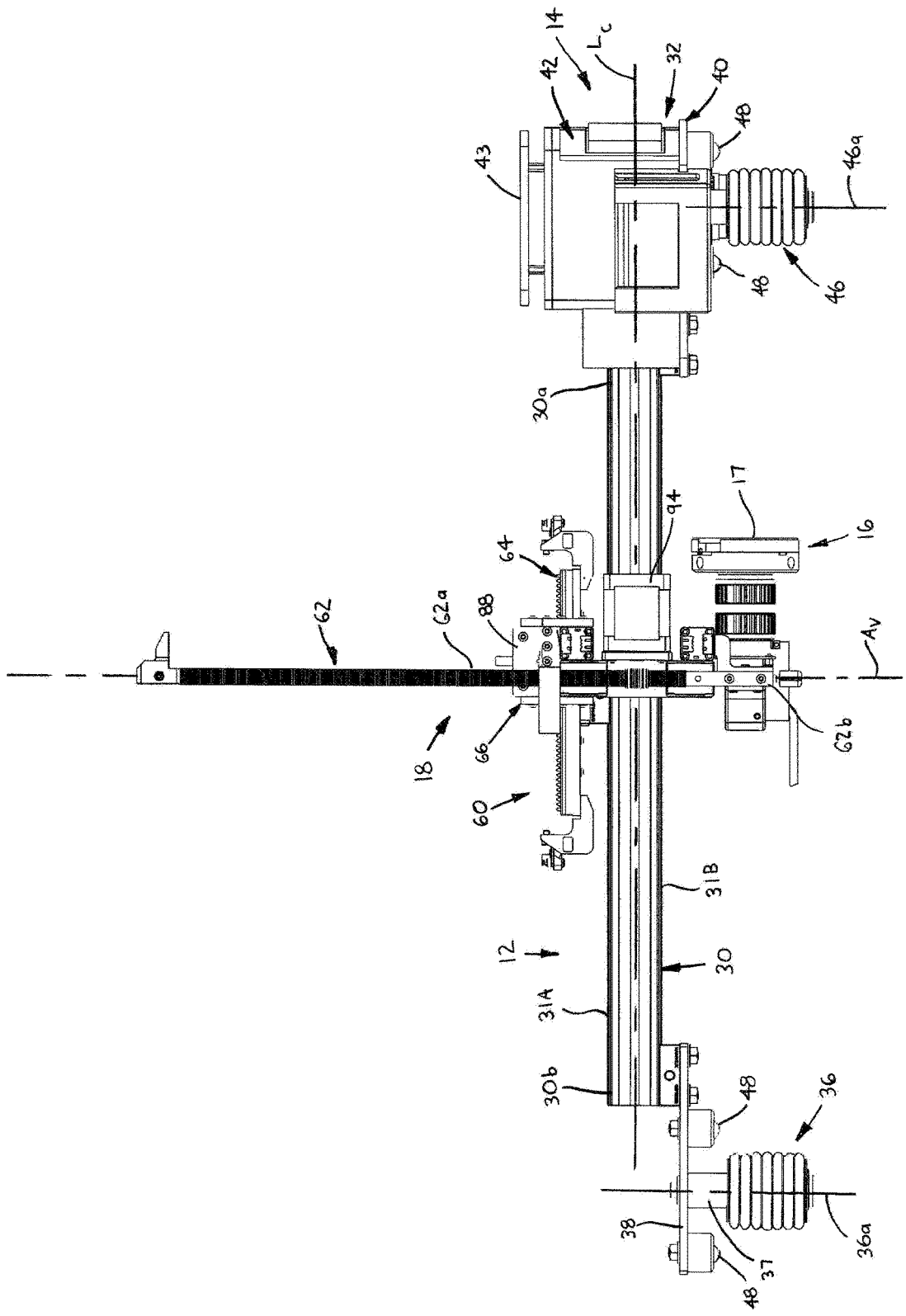
FIG. 15 is a side plan view of the first arrangement imaging system.
Figure 16:
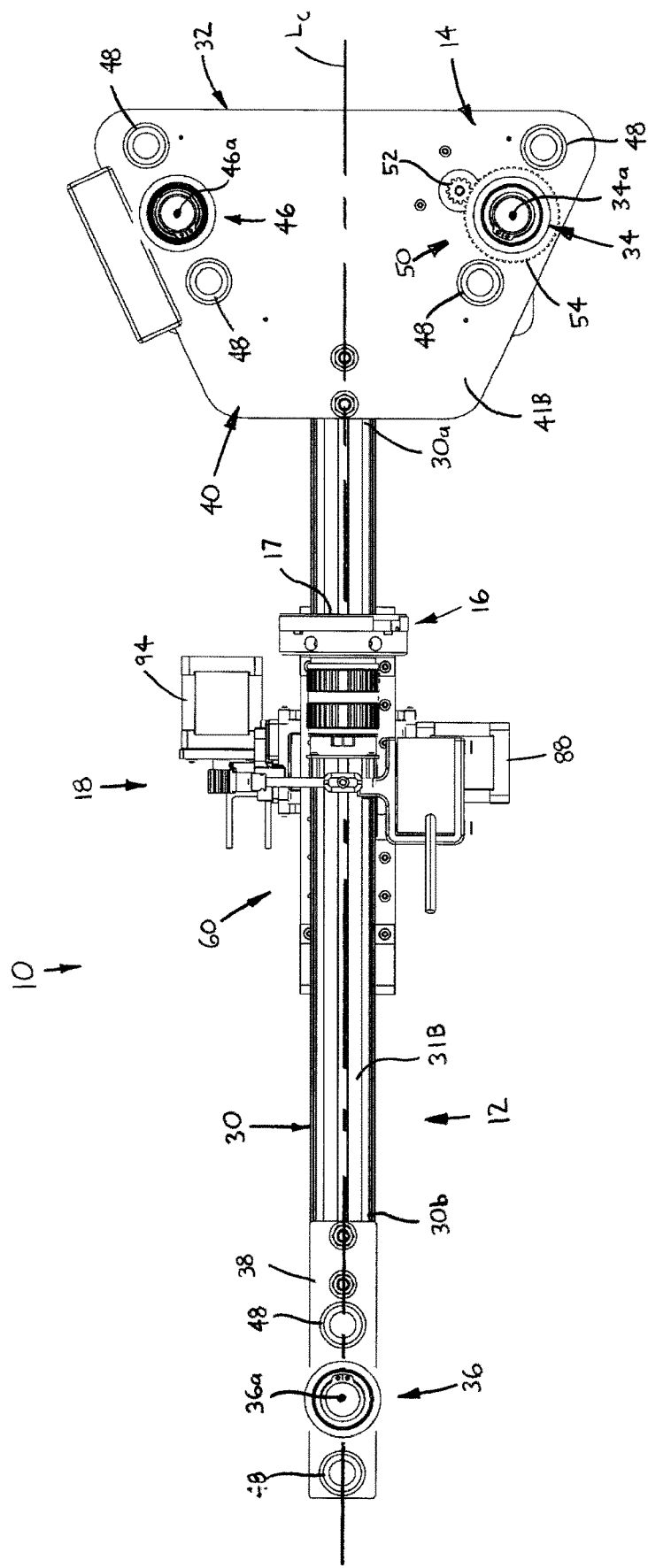
FIG. 16 is a bottom plan view of the first arrangement imaging system.
Figure 17:
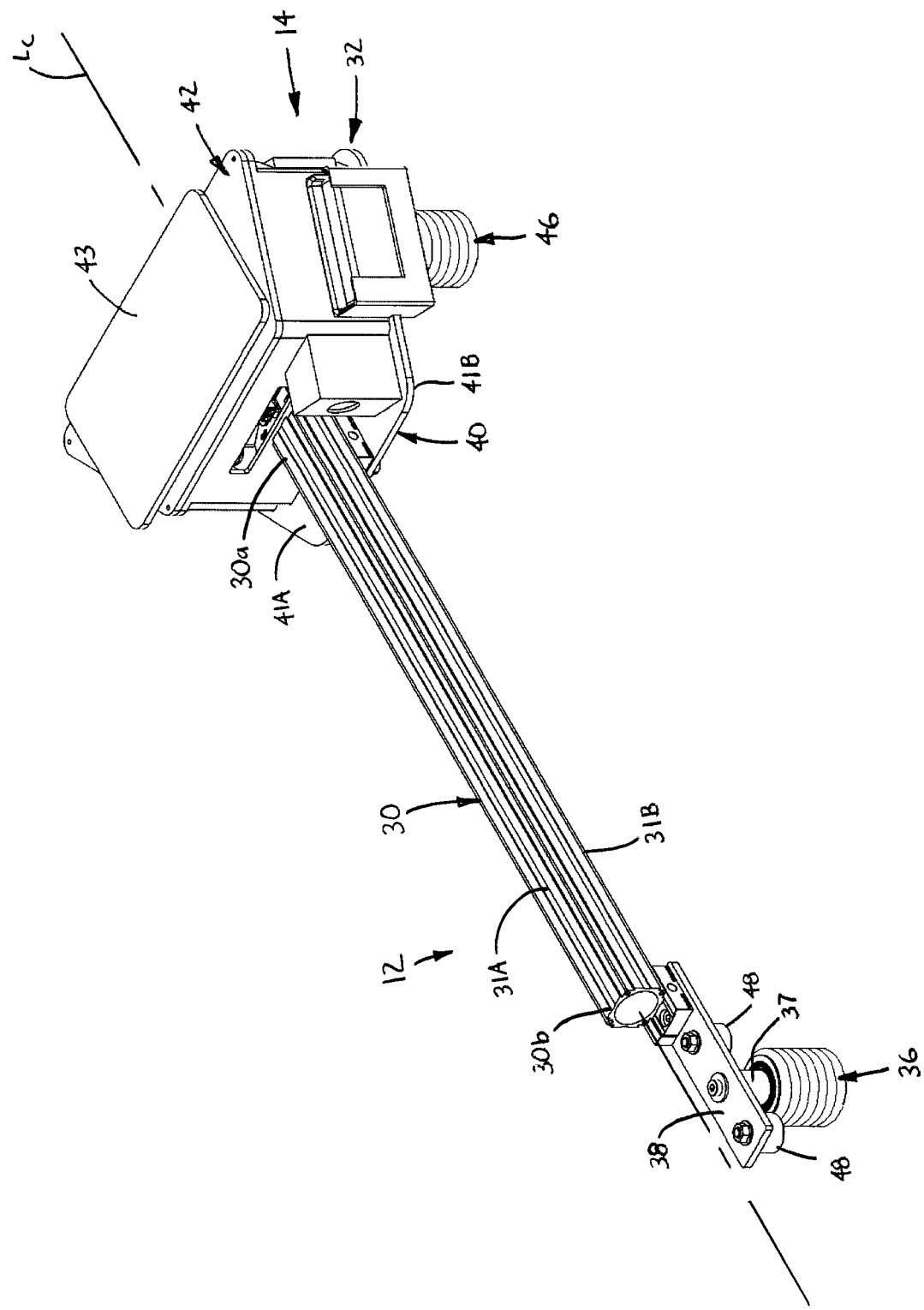
FIG. 17 is a front perspective view of a frame of the imaging system, shown in the first arrangement.

With this basic structure, the imaging system 10 is configured such that angular displacement of the frame 12 about the central axis $A_C$ of the bearing ring 2 rotates the optical imager 16 about the bearing ring central axis $A_C$. Thereby, the lens 17 of the imager 16 sequentially faces a plurality of separate arcuate segments S of the bearing raceway 1 and the optical imager 16 records an image I of each one of the raceway arcuate segments S until the frame 12 completes at least one revolution about the bearing central axis $A_C$. Preferably, the imaging system 10 further comprises a processor 24 configured to operate the optical imager 16 and the drive 14 (i.e., the drive motor 20) such that the optical imager 16 takes a series of the images I (FIG. 10) about the entire perimeter of the bearing raceway 1 as the drive 14 angularly displaces the frame 12 at least one revolution about the central axis $A_C$. Each image I depicts a separate one of a plurality of arcuate segments S of the raceway 1, as indicated in FIG. 10.

Further, the processor 24 is preferably configured to index each image I to the corresponding one of the plurality of arcuate segments S of the raceway 1. Thereby, each image I can be matched to or correlated with each specific raceway segment S for analysis of the raceway 1. Furthermore, the processor 24 or another processor 26 (FIG. 7) is preferably configured to receive the images I from the optical imager 16 and to connect the series of images I to form a panoramic image PI of the entire raceway 1, as depicted in FIG. 10. Such a panoramic image PI may be studied to determine the state of wear and/or potential damage to the raceway 1 by viewing any defects DE appearing on the raceway 1, as is also indicated in FIG. 10.

Figure 8:
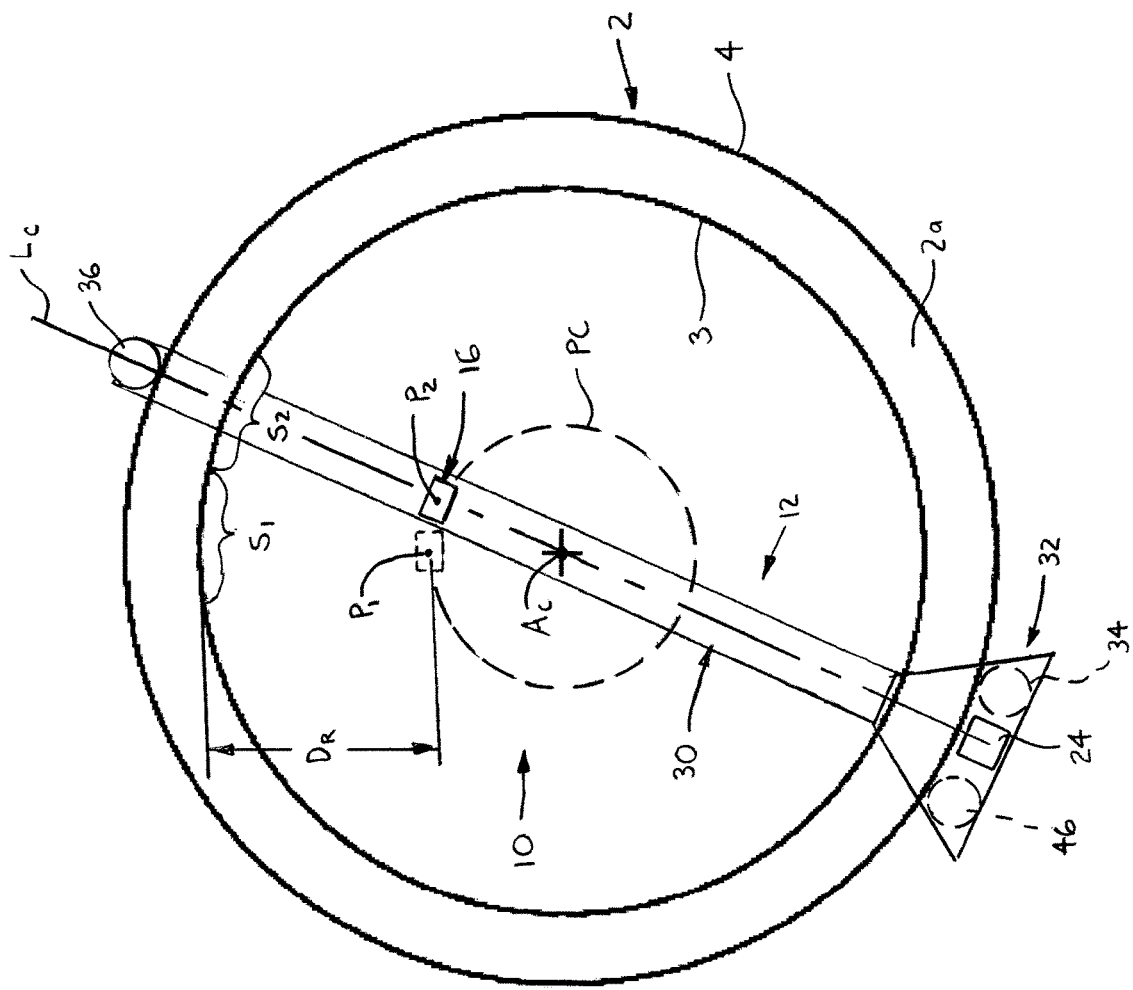
FIG. 8 is a more diagrammatic top elevational view of the imaging system in the first arrangement.
Figure 9:
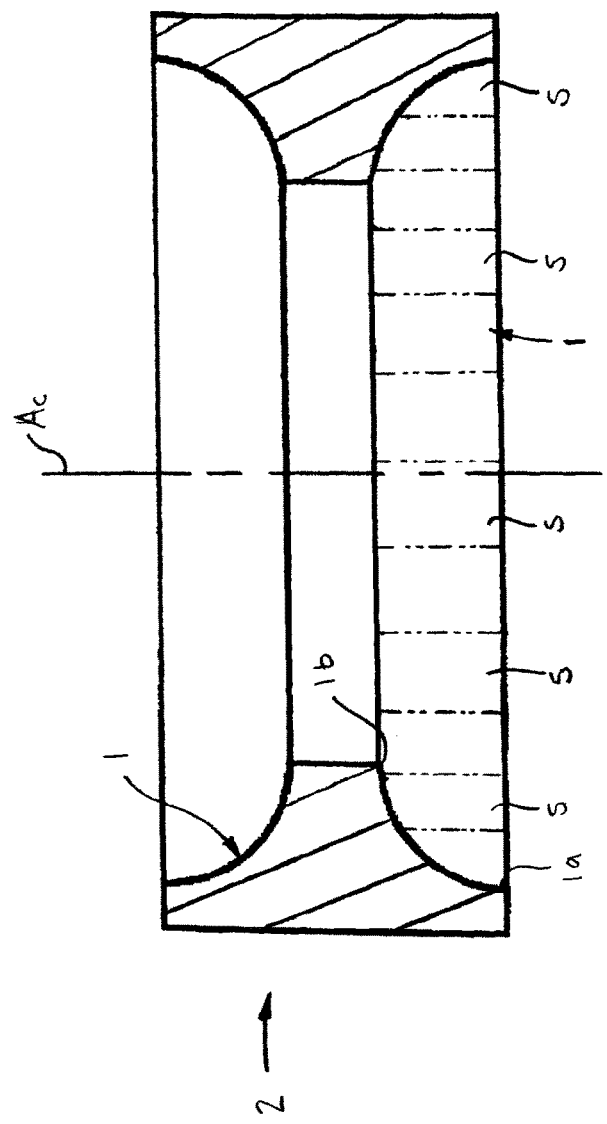
FIG. 9 is an axial cross-sectional view of an exemplary bearing ring, indicating separate raceway segments being imaged by the optical imager.

Preferably, the drive motor 20 is a stepper motor and the processor 24 is configured to operate the optical imager 16 such that one image I is taken each time the motor shaft 21 rotates through a predetermined number of steps. Such a predetermined number of motor steps corresponds to an angular displacement of the frame 12 which moves the optical imager 16 from a position $P_1$ facing one raceway arcuate segment S to another position $P_2$ facing an adjacent raceway arcuate segment S, as indicated in FIG. 8. However, the motor 20 may include a displacement sensor (none shown), for example a rotary encoder, or the imaging system 10 includes another means for detecting frame angular displacement about the central axis $A_C$. In either case, the processor 24 operates the imager 16 to take an image I when the processor 24 determines that the frame 12 has moved through a predetermined angular displacement.

Referring now to FIGS. 1-6, the imaging system 10 is preferably alternatively adaptable to record images I of a bearing outer raceway 1 (FIGS. 1-3) or to record images I of the bearing inner raceway 1 (FIGS. 4-6), as described in further detail below. Specifically, in a first arrangement as shown in FIGS. 1-3, the frame 12 is configured to engage with the outer circumferential surface 4 of the bearing ring 2 while the positioner 18 is mounted on a central section of the frame 12 so as to locate the optical imager 16 internally of the bearing ring 2. As such, the lens 17 of the optical imager 16 faces an inner raceway 1 on the bearing ring inner circumferential surface 3 and the imager 16 may be disposed generally on the bearing central axis $A_C$ or traverse a circular path PC (FIG. 8) about the axis $A_C$.

In a second arrangement as shown in FIGS. 4-6, the frame 12 is alternatively configured to engage with the inner circumferential surface 3 of the bearing ring 2 while the positioner 18 is disposed adjacent to an axial end of the frame 12 so as to locate the optical imager 16 externally of the bearing ring 2. As such, the lens 17 of the optical imager 16 faces an inner raceway 1 formed on the bearing ring outer circumferential surface 4 and the imager 16 traverses a circular path PC about the central axis $A_C$, as indicated in FIG. 6. Preferably, the frame 12 is also adjustable so as to be configured to be separately coupled with a plurality of different bearing rings 2 of various diametrical sizes, as described in detail below.

Thus, the imaging system 10 of the present invention is capable of being used to take images I of either a bearing inner raceway 1 or a bearing outer raceway 1 and may be used on bearing rings 2 in a relatively wide range of diametrical sizes. Further, by positioning the optical imager 16 between the axial ends 1a, 1b of the raceway 1 with the lens 17 facing generally perpendicularly to the surface of the raceway 1, the images I recorded by the imaging system 10 are substantially free of distortion, particular in comparison with known practices of taking images along the central axis $A_C$ of a bearing ring 2. Having described the basic elements and functioning above, these and other components of the present imaging system are described in further detail below Referring now to FIGS. 11-18, the frame 12 basically includes a main beam 30, a drive base 32 attached to the beam 30, the driven roller 34 and at least one idler roller 36. More specifically, the main beam 30 is preferably generally rectangular (i.e., has generally rectangular cross-sections) and elongated and has opposing first and second axial ends 30a, 30b, the frame centerline $L_C$ extending centrally between and through the two ends 30a, 30b, and upper and lower horizontal support surfaces 31A, 31B. The main beam 30 is sized, i.e., lengthwise between the axial ends 30a, 30b, so as to extend diametrically across one of the two axial ends 2a, 2b of the bearing 2 so as to be coupled thereto, as described below, and the positioner 18 is mounted to the upper support surface 31A as discussed in further detail below. The drive base 32 is connected with the first axial end 30a of the main beam 30 and is configured to support the drive 14. Preferably, the drive base 32 includes a generally trapezoidal main plate 40 with upper and lower support surfaces 41A, 41B and a trapezoidal-shaped housing 42 disposed on the plate upper support surface 41A and having a cover 43. The main plate 40 is attached to, preferably bolted to, a section of the beam lower support surface 31B and the housing 42 has a cavity 45 for containing the drive motor 20, the processor 24 and other components of the drive 14 as described below.

Further, the driven roller 34 is rotatably connected with the drive base 32, specifically by means of a roller shaft 35 extending through the main plate 40 so as to project downwardly from the plate lower surface 41B. The driven roller 34 is operably coupled with the drive 14 and is rollable along the ring outer circumferential surface 4 (FIGS. 1-3) or along the ring inner circumferential surface 3 (FIGS. 4-6) so as to angularly displace the frame 12 about the central axis $A_C$ of the bearing 2. Also, the idler roller 36 is rotatably connected with the main beam 30 so as to be spaced horizontally from the driven roller 34 and is rollable along the bearing inner surface 3 when the driven roller 34 rolls along the bearing inner surface 3 and is alternatively rollable along the bearing outer surface 4 when the driven roller 34 rolls along the bearing outer surface 4. The idler roller 36 is preferably removably or adjustably connected to the main beam 30 to both adapt the frame 12 for either of the two mounting arrangements and to adapt the frame 12 for different sized bearing rings 2. Specifically, the idler roller 36 is adjustable to vary a horizontal spacing distance dB (FIG. 18) between the idler roller 36 and the driven roller 34 such that the frame 12 is configured to be separately coupled with a plurality of different bearing rings 2 of various diametrical sizes. Preferably, the idler roller 36 has a central shaft 37 attached to a rectangular mounting plate 38, the plate 38 being connectable (e.g., fastenable or "boltable") to the beam lower support surface 31B at various locations along the frame centerline $L_C$.

Figure 18:
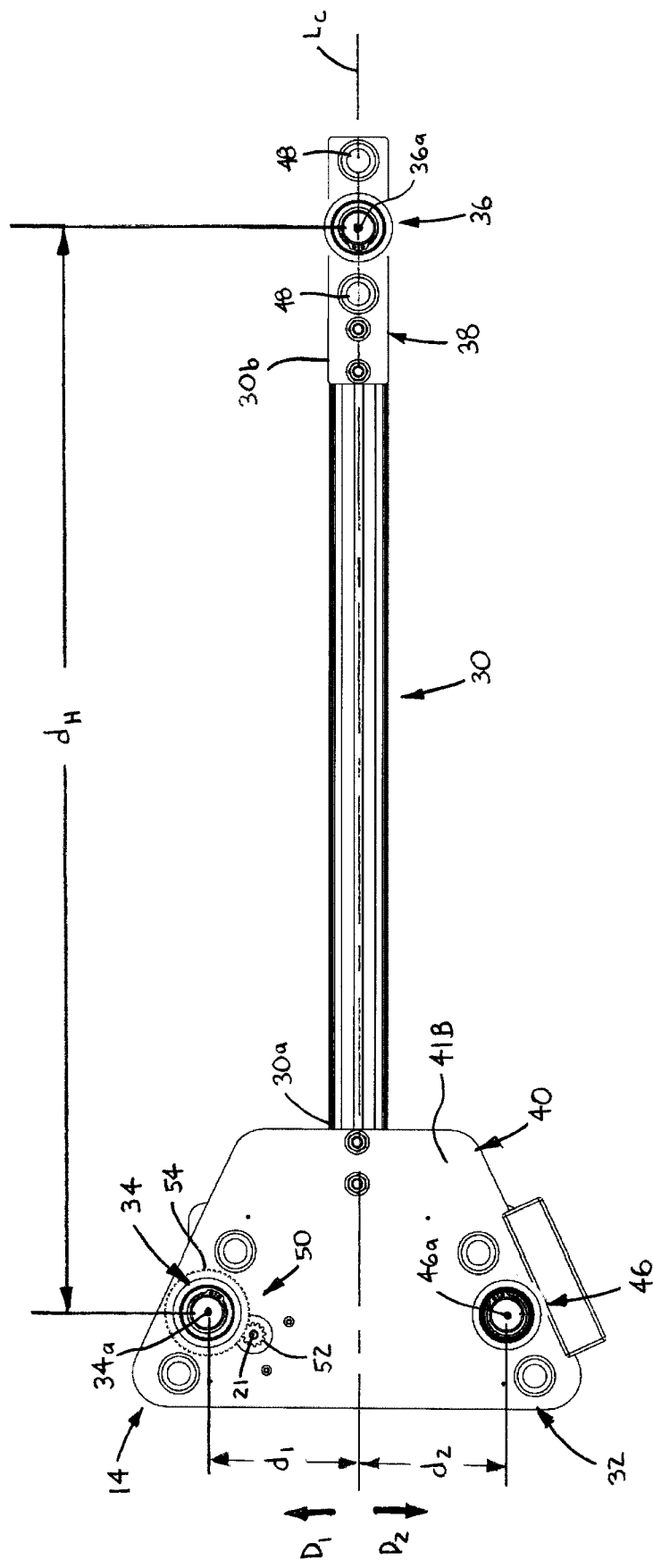
FIG. 18 is a bottom plan view of the frame in the first arrangement.
Figure 19:
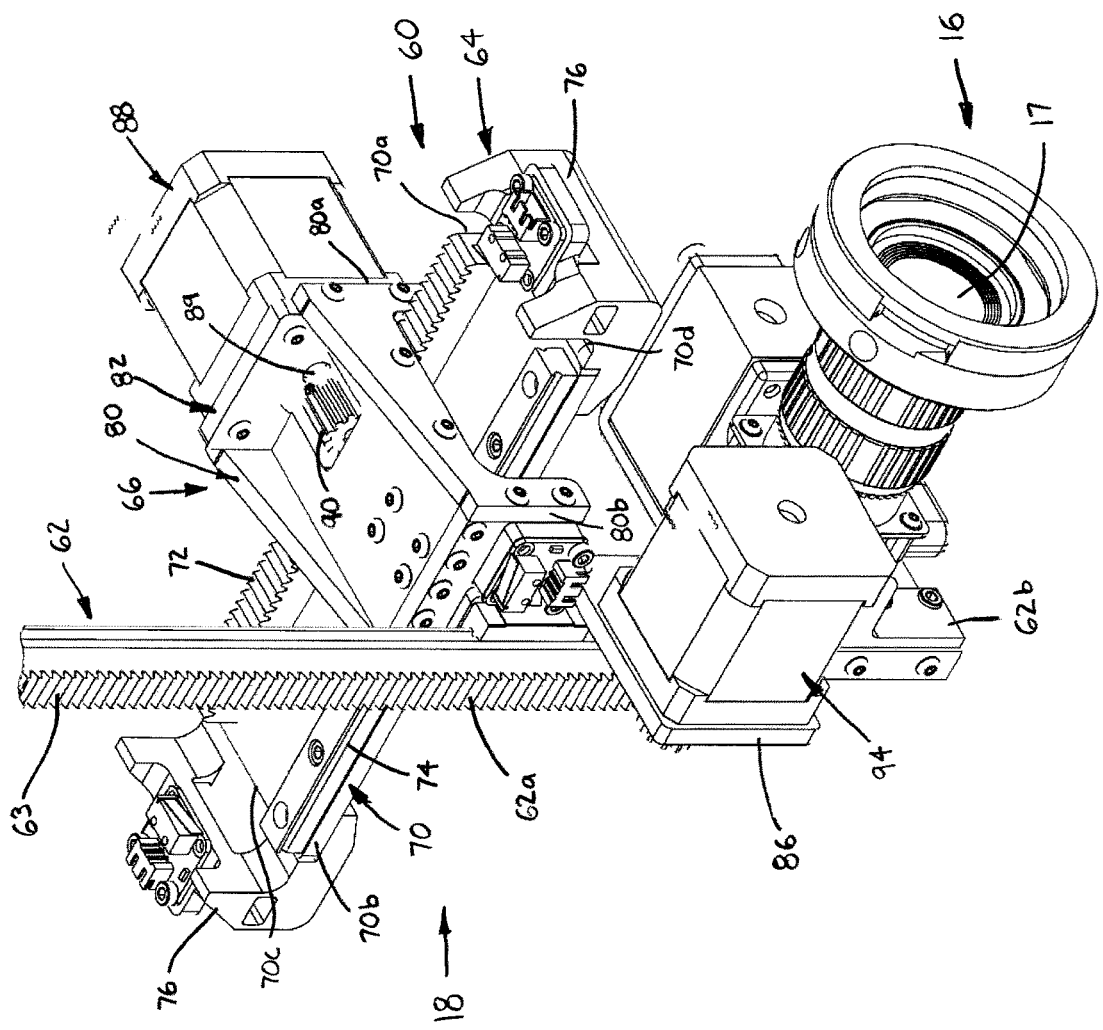
FIG. 19 is a broken-away, enlarged rear perspective view of a positioner of the imaging system.
Figure 20:
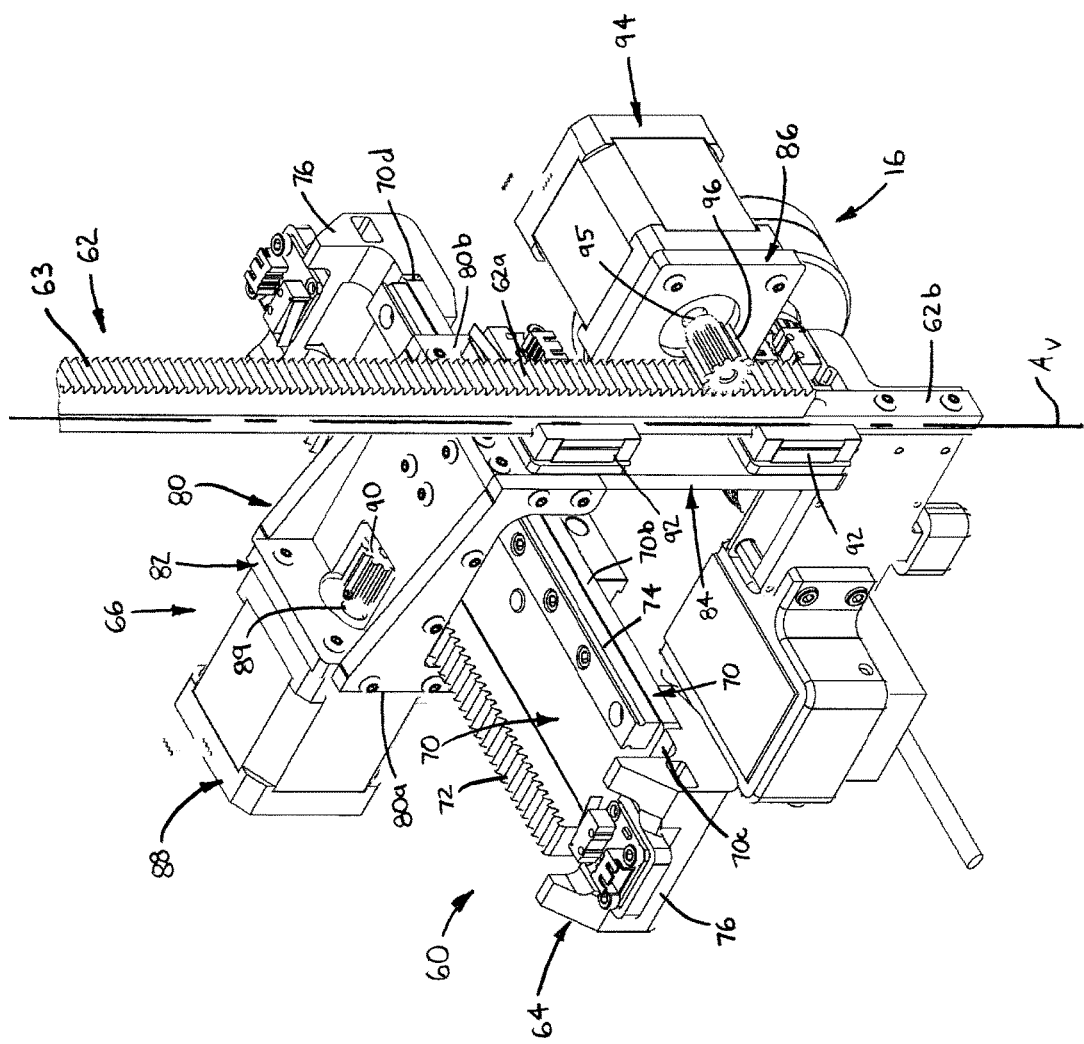
FIG. 20 is a broken-away, enlarged front perspective view of the positioner.
Figure 21:
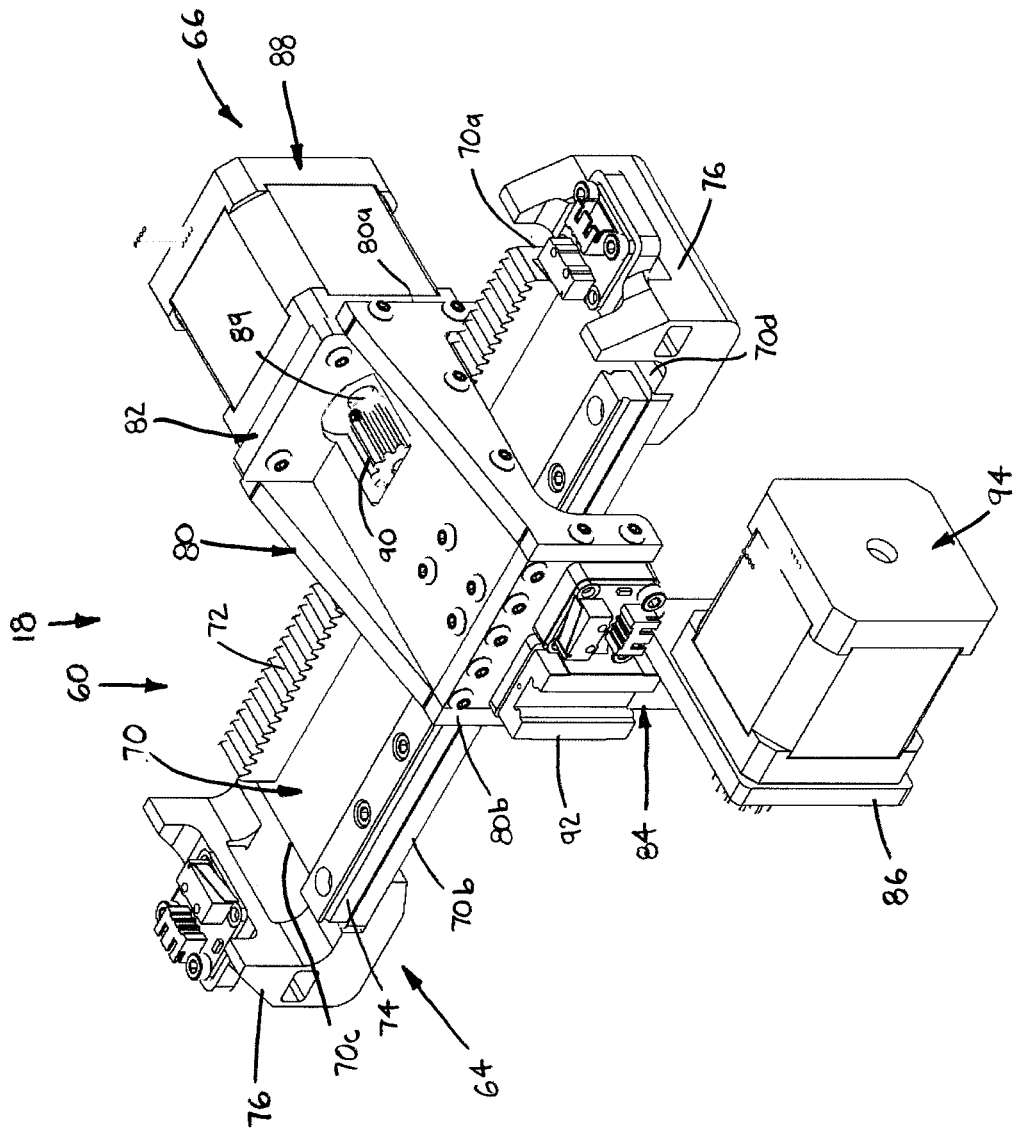
FIG. 21 is a broken-away, enlarged rear perspective view of a base of the positioner.
Figure 22:
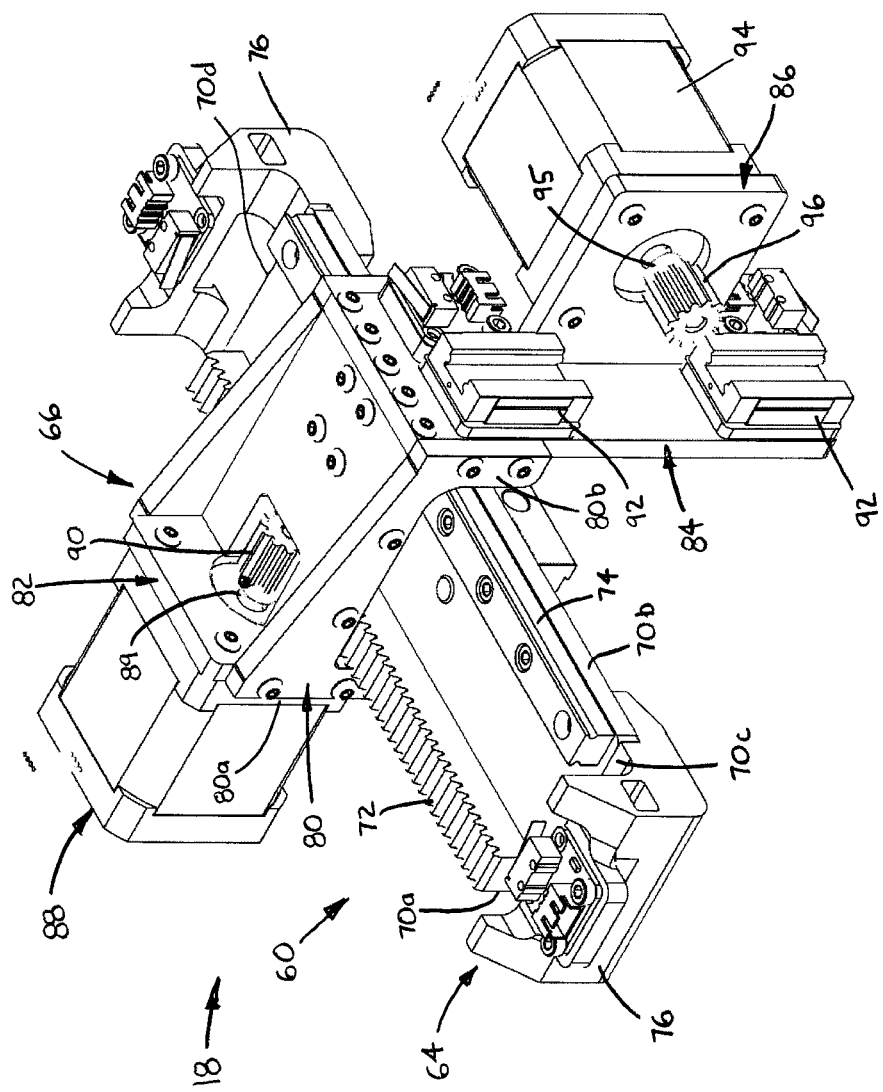
FIG. 22 is a broken-away, enlarged front perspective view of the positioner base.
Figure 23:
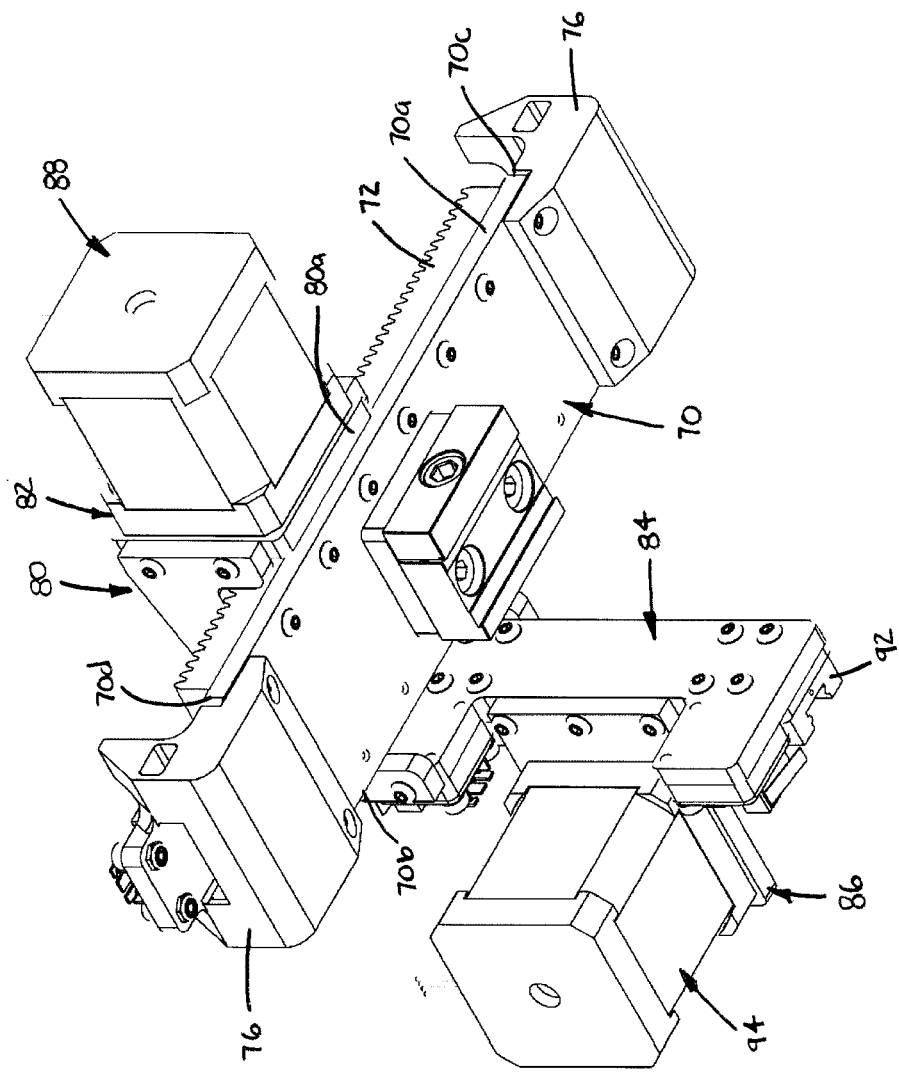
FIG. 23 is a broken-away, enlarged bottom perspective view of the positioner base.
Figure 24:
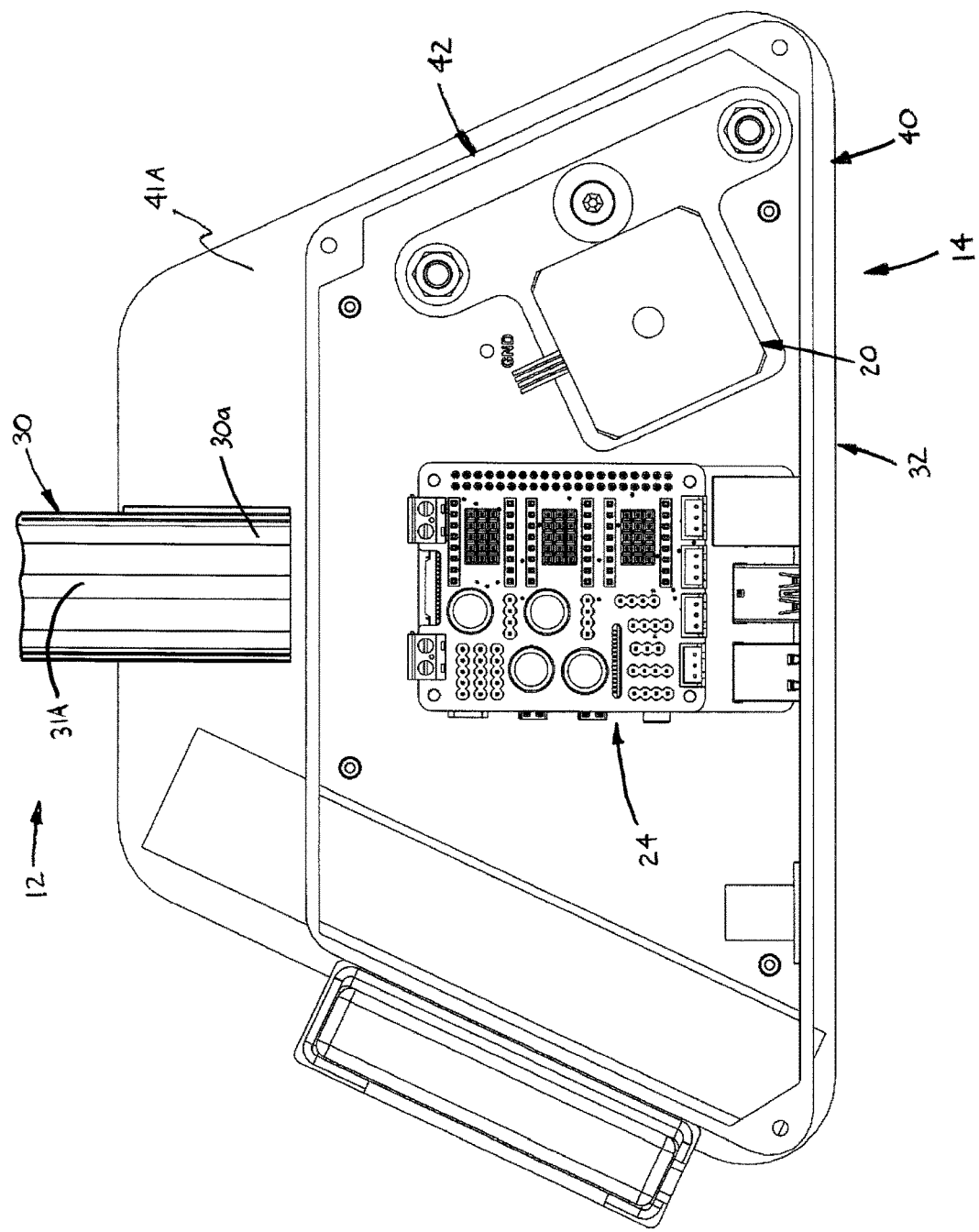
FIG. 24 is a broken-away, enlarged top plan view of a drive base of the frame, shown without a cover member.
Figure 25:
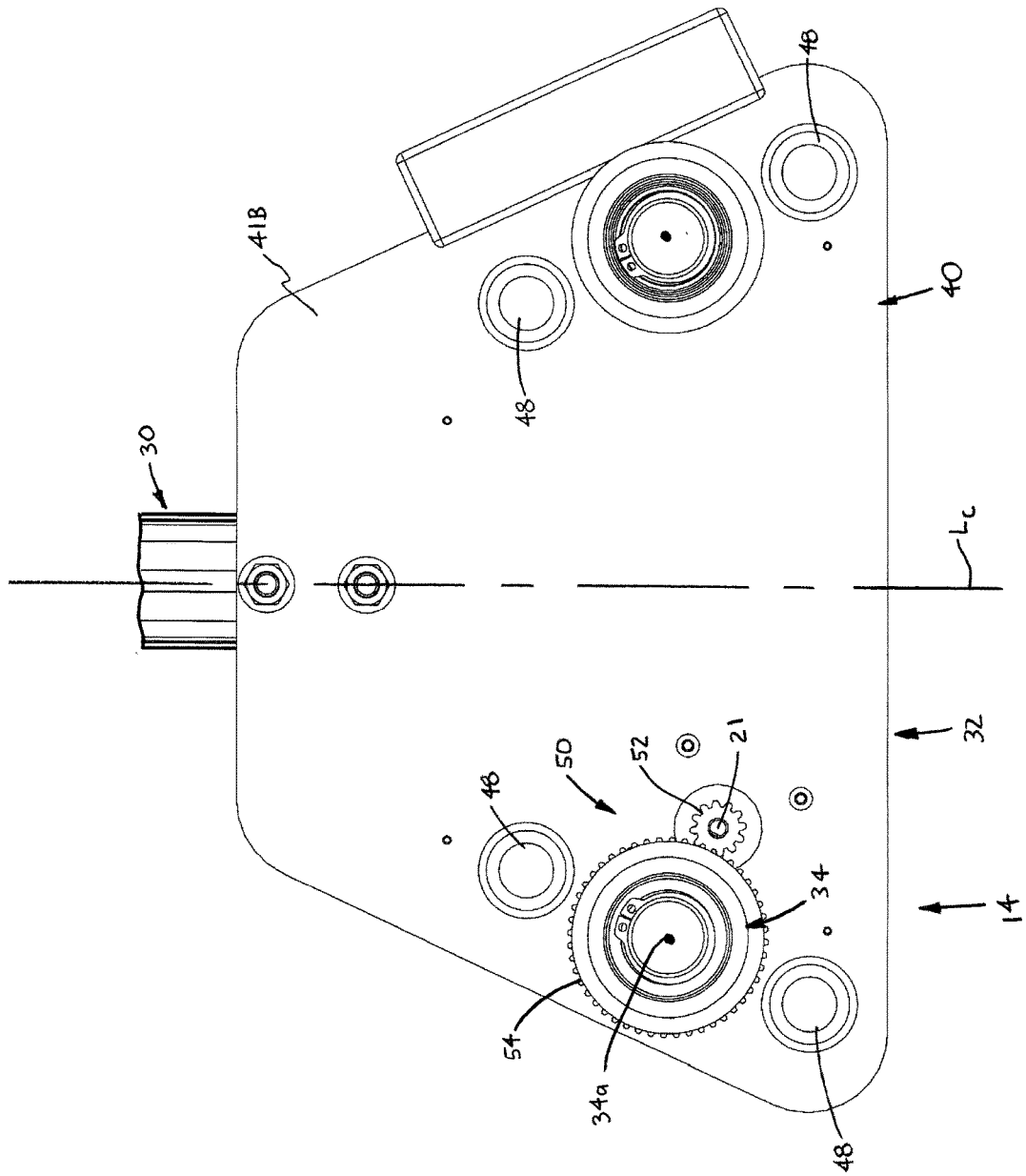
FIG. 25 is a broken-away, enlarged bottom plan view of the drive base.

Further, the frame 12 preferably further includes a second idler roller 46 rotatably connected with the drive base 32 and rollable along the same one of the ring inner circumferential surface 3 and the ring outer circumferential surface 4 that is engaged by the driven roller 34. The second idler roller 46 is provided to create a "tripod effect" to balance the frame 12 on the three rollers 34, 36 and 46 engaged with the bearing ring 2. Specifically, the idler roller 36 is rotatable about an axis 36a generally intersecting the beam centerline $L_C$ while the driven roller 34 is rotatable about an axis 34a spaced horizontally a distance $d_1$ from the frame centerline $L_C$ in a first direction D1 and the second idler roller 46 is rotatable about an axis 46a spaced horizontally a second distance $d_2$ from the frame centerline $L_C$ in a second, opposing direction D2, as indicated in FIG. 18. As such, the driven roller 34, the primary idler roller 36 and the second idler roller 46 are arranged in a triangular pattern so as to balance the frame 12 upon the bearing ring 2. Preferably, the frame 12 further includes a plurality of support rollers 48 mounted on the idler roller mounting plate 38 and to the drive base 32 and configured to roll upon the adjacent axial end 2a or 2b of the bearing ring 2. Thereby, the weight of the imaging system 10 is supported on the ring 2 through the support rollers 48.

Referring to FIGS. 16, 18, 24 and 25, the drive 14 includes the drive motor 20 and a simple gear train 50 drivably engaging the motor 20 with the driven roller 34. More specifically, the drive motor 20 includes a shaft 21 and is mounted on the drive base 32, preferably bolted onto the upper surface 41A of the drive base plate 40 with the shaft 21 extending through an opening (not shown) in the plate 40. The gear train 50 includes a pinion gear 52 mounted on the motor shaft 21 and disposed beneath the plate lower surface 41B and a driven gear 54 mounted on the driven roller shaft 35 beneath the plate lower surface 41B and drivably engaged by the pinion gear 52.

With this drive structure, rotation of the motor shaft 21 rotates the pinion gear 52 to drive the engaged driven gear 54, and thereby the driven roller 34 about the driven roller axis 34a. The driven roller 34 and the idler roller 36, and preferably also the second idler roller 46, each have a rubberized outer surface (not indicated) so as to be frictionally engaged with either the ring inner surface 3 or the ring outer surface 4, such frictional engagement being established by setting the horizontal spacing distance $d_H$ between the idler roller 36 and the driven roller 34 (which is identical to the spacing distance between the idler roller 36 and the second idler roller 46). As the drive motor 20 drives the driven roller 34 through the gear train 50, the driven roller 34 rolls (and displaces) along the particular ring circumferential surface 3 or 4, pulling the connected drive base 32 and thereby the remainder of the frame 12 to rotate about the bearing central axis $A_C$ while the idler rollers 36, 46 likewise roll along the particular surface 3 or 4. However, the drive 14 may alternatively include additional gears or be configured as a belt-drive or any other appropriate type of drive.

Referring now to FIGS. 11-25, the positioner 18 is preferably adjustably mounted to the frame 12 so as to be either centrally mounted on the beam 30 in the frame first configuration or mounted adjacent to the second axial end 30b of the beam in the second frame configuration. Specifically, the positioner 18 is mounted to a central section of the main beam 30 to position the optical imager 16 within the bearing inner surface 3, with the idler roller 36 connected with the beam second axial end 30b and the driven roller 34 and the idler roller 36 each being engageable with the bearing outer surface 4. Alternatively, the positioner 18 is mounted adjacent to the second axial end 30b of the main beam 30 to position the optical imager 16 externally of the bearing outer surface 4, with the idler roller 36 being connected with a central section of the beam 30 and the driven roller 34 and the idler roller 36 each being engageable with the bearing inner surface 3.

Preferably, the positioner 18 includes a base 60 disposed on the frame 12, specifically the beam 30, and a vertical support rod 62 having an upper end 62a connected with the base 60 and a lower end 62b configured to support the optical imager 16. The positioner base 60 preferably includes a fixed member 64 attached to the frame 12 and a movable member 66 displaceably connected with the fixed member 64 so as to be linearly displaceable generally along the frame centerline $L_C$. The support rod 62 is coupled with the movable member 66 such that the radial distance $D_R$ (FIG. 8) between the optical imager 16 and the bearing raceway 1 is adjustable by displacing the moveable member 66 with respect to the fixed member 64.

More specifically, the base fixed member 64 preferably includes a generally rectangular plate 70 with opposing longitudinal side edges 70a, 70b extending generally parallel with the frame centerline $L_C$ and opposing axial ends 70c, 70d. A rack gear 72 extends along one side edge 70a and an elongated slide plate 74 extends along the other side edge 70b, and the fixed member 64 preferably includes two end caps 76 each attached to a separate plate end 70c, 70d. The movable member 66 preferably includes a horizontal bracket 80 extending across the side edges 70a, 70b of the fixed member plate 70 and having opposing first and second lateral ends 80a, 80b, a first motor bracket 82 attached to the first lateral end 80a, a vertical bracket 84 extending downwardly from the second lateral end 80b and a second motor bracket 86 attached to the vertical bracket 84. A horizontal position motor 88 is mounted to the first motor bracket 82 has a shaft 89 and a pinion gear 90 mounted on the shaft 89 and engaged with the horizontal rack 72. As such, rotation of the motor shaft 89 linearly displaces the moveable member 66 generally along the frame centerline $L_C$, so as to adjust or vary the radial distance $D_R$ between the imager 16 and the raceway 1.

Figure 7:
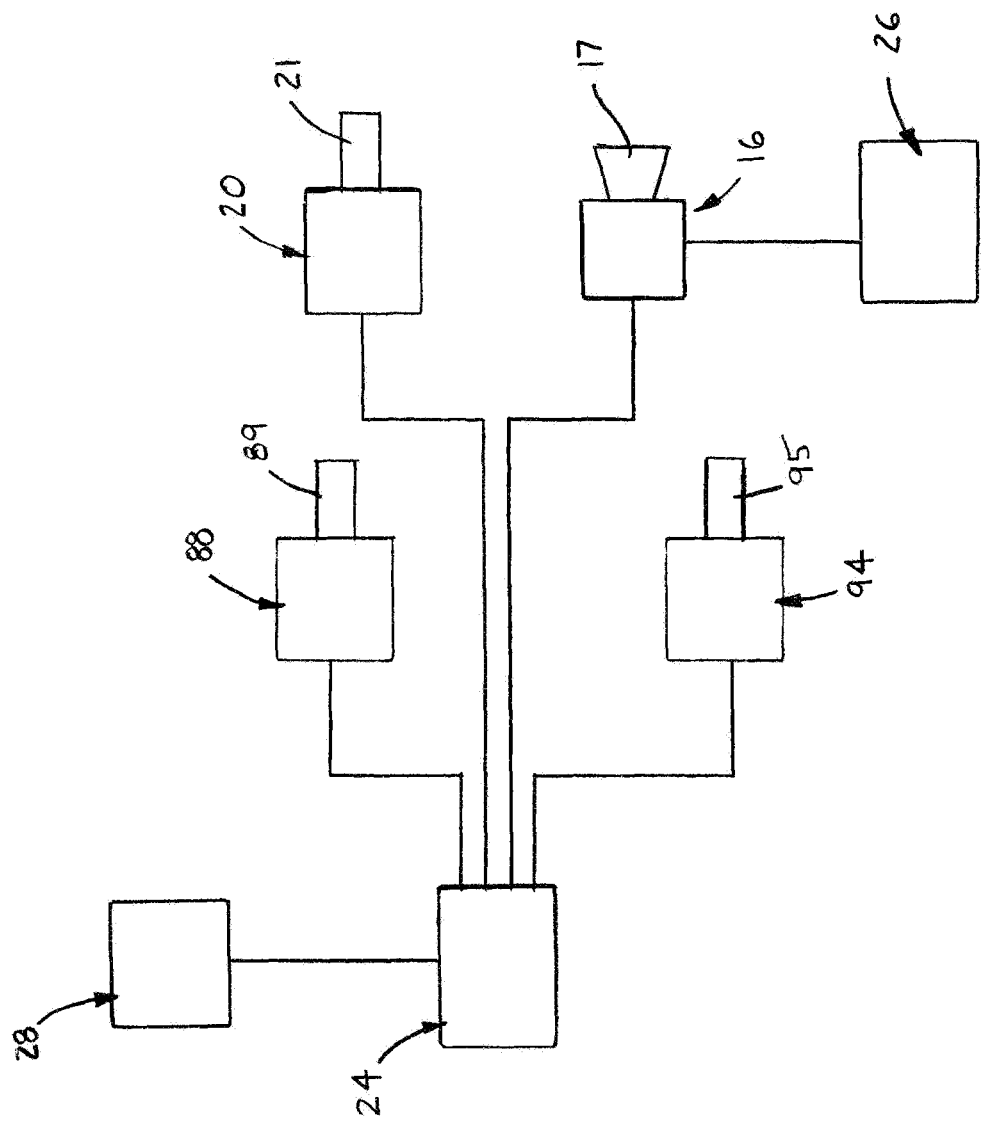
FIG. 7 is a more diagrammatic view of a control arrangement of the imaging system.

Further, the vertical bracket 84 provides two vertically spaced apart support members 92 slidably supporting the support rod 62, which includes a vertically extending rack gear 63. A vertical position motor 94 is mounted to the second motor bracket 86 and includes a shaft 95 and a pinion gear 96 mounted on the shaft 95. The pinion gear 96 is engaged with the vertical rack gear 63 such that rotation of the motor shaft 95 linearly displaces the rack 63 along a vertical axis $A_V$ (FIGS. 15 and 20) generally perpendicular to, but spaced from, the frame centerline $L_C$ to adjust the vertical position of the optical imager 16 relative to the bearing raceway 1. Preferably, the horizontal position motor 88 and the vertical position motor 94 are each coupled with the processor 24, either by electrical wire or wirelessly, as indicated in FIG. 7. As such, the radial and vertical positions of the optical imager 16 with respect to the raceway 1 may be automatically established by the processor 24, for example by appropriate programming which enables a user to input the dimensions of the bearing ring 2, or alternatively allows a user to "manually" adjust the radial and vertical positions by directly operating the positioner motors 88 and 94.

In use, a user first configures the imaging system 10 in the first arrangement of FIGS. 1-3 or the second arrangement of FIGS. 4-6, depending on whether the bearing ring 2 is an outer ring or an inner ring, by appropriately mounting the positioner 18 and the idler roller 36 on the frame main beam 30 as described above. Then, the imaging system 10 is mounted on the bearing ring 2 to be imaged, such that the driven roller 34 and the idler rollers 36, 46 are engaged with the ring outer surface 4 or the ring inner surface 3 and the support rollers 48 are disposed on the ring axial end 2a or 2b. Thereafter, the horizontal and vertical positions of the optical imager 16 are adjusted by means of the position motors 88, 94, either manually by a user operating an input device 28 coupled with the processor 26 or automatically by the processor 26. Finally, the processor 26 operates the drive motor 20 to angularly displace the frame 12 about the ring central axis $A_C$ while simultaneously operating the optical imager 16 to take a series of images of the raceway 1, preferably a series of images I of each separate raceway segment S about the raceway perimeter as discussed above.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. An imaging system for recording images of a raceway of a bearing ring, the bearing ring having first and second, opposing axial ends, a central axis extending between the first and second axial ends, an inner circumferential surface and an outer circumferential surface, and the raceway being formed on the inner circumferential surface of the bearing ring or the outer circumferential surface of the bearing ring and having first and second axial ends spaced along the central axis, the imaging system comprising:

a frame movably coupleable with the bearing ring such that the entire frame is supported directly on at least one of the inner circumferential surface of the bearing ring and the outer circumferential surface of the bearing ring and including a main beam extending diametrically across one of the two axial ends of the bearing ring and having opposing first and second axial ends and a centerline extending between the first and second axial ends;

a drive mounted to the frame and configured to angularly displace the frame about the bearing central axis so that the frame and the drive angularly displace about the central axis of the bearing ring, the central axis extending through the main beam;

an optical imager having a lens; and an adjustable positioner mounted on the main beam of the frame and configured to position the optical imager such that the lens is disposed axially between the raceway first and second axial ends and facing generally perpendicular to the bearing raceway.

2. The imaging system as recited in claim 1 further comprising a processor configured to operate the optical imager and the drive such that the optical imager takes a series of images about the entire perimeter of the bearing raceway as the drive angularly displaces the frame at least one revolution about the centerline, each image depicting a separate one of a plurality of arcuate segments of the raceway.

3. The imaging system as recited in claim 2 wherein the processor or another processor is configured to receive the images from the optical imager and to connect the series of images to form a panoramic image of the entire raceway.

4. The imaging system as recited in claim 2 wherein the drive includes a stepper motor with a shaft and the processor is configured to operate the optical imager such that one image is taken each time the motor shaft rotates through a predetermined number of steps corresponding to an angular displacement of the frame which moves the optical imager from a position facing one raceway arcuate segment to another position facing an adjacent raceway arcuate segment.

5. The imaging system as recited in claim 1 wherein the optical imager is a digital camera or a microscope.

6. The imaging system as recited in claim 1 wherein angular displacement of the frame about the bearing ring central axis rotates the optical imager about the bearing central axis such that the lens sequentially faces a plurality of separate arcuate segments of the bearing raceway and the optical imager records an image of each one of the raceway arcuate segments until the frame completes at least one revolution about the bearing central axis.

7. The imaging system as recited in claim 1 wherein:

the frame is configured to engage with the outer circumferential surface of the bearing ring while the positioner locates the optical imager internally of the bearing ring such that the lens of the optical imager faces an inner raceway on the bearing ring inner circumferential surface; and the frame is alternatively configured to engage with the inner circumferential surface of the bearing ring while the positioner locates the optical imager externally of the bearing ring such that the lens of the optical imager faces an inner raceway formed on the bearing ring outer circumferential surface.

8. The imaging system as recited in claim 1 wherein the frame includes:

a drive base connected with the first axial end of the main beam and configured to support the drive;

a driven roller rotatably connected with the drive base, operably coupled with the drive and rollable along the ring outer circumferential surface or along the ring inner circumferential surface so as to angularly displace the frame about the central axis of the bearing; and an idler roller rotatably connected with the beam so as to be spaced horizontally from the driven roller, the idler roller being rollable along the bearing inner surface when the driven roller rolls along the bearing inner surface and rollable along the bearing outer surface when the driven roller rolls along the bearing outer surface.

9. The imaging system as recited in claim 8 wherein the drive includes a motor mounted on the drive base and having a shaft coupled with the driven roller so as to rotate the driven roller about a driven roller axis extending perpendicular to the frame beam centerline.

10. The imaging system as recited in claim 8 wherein the frame further includes a second idler roller rotatably connected with the drive base and rollable along the one of the ring inner circumferential surface and ring outer circumferential surface engaged by the driven roller, the idler roller being rotatable about an axis generally intersecting the beam centerline, the driven roller being rotatable about an axis spaced horizontally from the frame centerline in a first direction, and the second idler roller being rotatable about an axis spaced horizontally from the frame centerline in a second, opposing direction such that the driven roller, the idler roller and the second idler roller are arranged in a triangular pattern so as to balance the frame upon the bearing ring.

11. The imaging system as recited in claim 8 wherein the idler roller is adjustably connected with the main beam so as to vary a horizontal spacing distance between the idler roller and the driven roller such that the frame is configured to be separately coupled with a plurality of different bearing rings of various diametrical sizes.

12. The imaging system as recited in claim 8 wherein one of:

the positioner is mounted to a central section of the main beam to position the optical imager within the bearing inner surface, the idler roller being connected with the beam second axial end and the driven roller and the idler roller each being engageable with the bearing outer surface; and the positioner is mounted adjacent to the second axial end of the main beam to position the optical imager externally of the bearing outer surface, the idler roller being connected with a central section of the beam and the driven roller and the idler roller each being engageable with the bearing inner surface.

13. The imaging system as recited in claim 1 wherein the positioner includes a base disposed on the frame and a vertical support rod having an upper end connected with the base and a lower end configured to support the optical imager.

14. The imaging system as recited in claim 13 wherein the positioner base includes a fixed member attached to the frame and a movable member displaceably connected with the fixed member, the support rod being coupled with the movable member such that the radial distance between the optical imager and the bearing raceway is adjustable by displacing the base moveable member with respect to the base fixed member.

15. The imaging system as recited in claim 14 wherein the base fixed member includes a horizontal rack gear and the positioner further includes a horizontal position motor mounted on the base moveable member, the horizontal position motor having a shaft and a pinion gear mounted on the shaft and engaged with the horizontal rack such that rotation of the motor shaft linearly displaces the moveable member generally along the frame centerline.

16. The imaging system as recited in claim 14 wherein the support rod includes a vertically extending rack gear and the positioner further includes a vertical position motor connected with the base movable member, the vertical position motor having a shaft and a pinion gear mounted on the shaft, the pinion gear being engaged with the vertical rack gear such that rotation of the motor shaft linearly displaces the rack along a vertical axis generally perpendicular to the frame centerline to adjust the vertical position of the optical imager.

17. The imaging system as recited in claim 16 wherein:
the base fixed member includes a generally rectangular plate with opposing side edges extending generally parallel with the frame centerline, the rack gear extending along one side edge and a slide plate extending along the other side edge; and
the base moveable member includes a horizontal bracket extending across the side edges of the fixed member plate, the horizontal position motor being mounted to the horizontal bracket, a vertical bracket attached to the horizontal bracket and providing two vertically spaced apart support members slidably supporting the support rod, and a motor bracket attached to the vertical bracket and configured to support the vertical position motor.

18. An imaging system for recording images of a raceway of a bearing ring, the bearing ring having first and second, opposing axial ends, a central axis extending between the first and second axial ends, an inner circumferential surface and an outer circumferential surface, and the raceway being formed on the inner circumferential surface of the bearing ring or the outer circumferential surface of the bearing ring and having first and second ends spaced along the central axis, the imaging system comprising:
a frame movably coupleable with the bearing ring such that the entire frame is supported directly on at least one of the inner circumferential surface of the bearing ring and the outer circumferential surface of the bearing ring and including:
a main beam extending diametrically across one of the two axial ends of the bearing ring and having opposing first and second axial ends and centerline extending between the first and second axial ends;
a drive base connected with the first axial end of the main beam,
a driven roller rotatably connected with the drive base and rollable along the ring outer circumferential surface or along the ring inner circumferential surface so as to angularly displace the frame about the central axis of the bearing; and
an idler roller rotatably connected with the beam so as to be spaced horizontally from the driven roller, the idler roller being rollable along the bearing inner surface when the driven roller rolls along the bearing inner surface and rollable along the bearing outer surface when the driven roller rolls along the bearing outer surface;
a drive mounted to the frame and including a motor coupled with the driven roller and configured to rotate the driven roller about the central axis so that the frame and the drive angularly displace about the central axis of the bearing ring, the central axis extending through the main beam;
an optical imager having a lens;
an adjustable positioner mounted on the main beam of the frame and configured to position the optical imager such that the lens is disposed axially between the raceway first and second ends and facing generally perpendicular to the bearing raceway; and
a processor configured to operate the optical imager and the drive motor such that the optical imager takes a series of images about the entire perimeter of the bearing raceway as the drive motor angularly displaces the frame at least one revolution about the centerline, each image depicting a separate one of a plurality of arcuate segments of the raceway.

19. The imaging system as recited in claim 18 wherein the positioner base includes a fixed member attached to the frame and a movable member displaceably connected with the fixed member, the support rod being coupled with the movable member such that the radial distance between the optical imager and the bearing raceway is adjustable by displacing the base moveable member with respect to the base fixed member.

20. The imaging system as recited in claim 19 wherein:
the base fixed member includes a horizontal rack gear and the positioner further includes a horizontal position motor mounted on the base moveable member, the horizontal position motor having a shaft and a pinion gear mounted on the shaft and engaged with the horizontal rack such that rotation of the motor shaft linearly displaces the moveable member generally along the frame centerline; and
the support rod includes a vertically extending rack gear and the positioner further includes a vertical position motor connected with the base movable member, the vertical position motor having a shaft and a pinion gear mounted on the shaft, the pinion gear being engaged with the vertical rack gear such that rotation of the motor shaft linearly displaces the rack along a vertical axis generally perpendicular to the frame centerline to adjust the vertical position of the optical imager.

* * * * *